United States Patent
Takano et al.

(10) Patent No.: US 9,213,127 B2
(45) Date of Patent: Dec. 15, 2015

(54) VIRTUAL IMAGE EMERGING ORNAMENTAL BODY AND METHOD FOR MANUFACTURING VIRTUAL IMAGE EMERGING ORNAMENTAL BODY

(71) Applicant: SEIKO EPSON CORPORATION, Tokyo (JP)

(72) Inventors: Yasushi Takano, Matsumoto (JP); Toshimitsu Hirai, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 13/972,519

(22) Filed: Aug. 21, 2013

(65) Prior Publication Data

US 2014/0055862 A1    Feb. 27, 2014

(30) Foreign Application Priority Data

Aug. 23, 2012    (JP) ................................. 2012-183896

(51) Int. Cl.
*G02B 27/10* (2006.01)
*G02B 3/00* (2006.01)
*G09F 19/12* (2006.01)

(52) U.S. Cl.
CPC ............ *G02B 3/0012* (2013.01); *G02B 3/0056* (2013.01); *G09F 19/12* (2013.01)

(58) Field of Classification Search
CPC ..................................................... G02B 3/0056
USPC .......................................................... 359/626
See application file for complete search history.

(56) References Cited

U.S. PATENT DOCUMENTS

| | | | | |
|---|---|---|---|---|
| 5,151,790 A | * | 9/1992 | Takatori et al. | 348/335 |
| 5,723,200 A | * | 3/1998 | Oshima et al. | 428/172 |
| 2009/0167983 A1 | * | 7/2009 | Lee et al. | 349/62 |
| 2010/0059844 A1 | * | 3/2010 | Tanaka | 257/432 |

FOREIGN PATENT DOCUMENTS

| | | |
|---|---|---|
| JP | 02761861 | 3/1998 |
| JP | 2002-046400 | 2/2002 |
| JP | 2002-120500 | 4/2002 |
| JP | 2005-007593 | 1/2005 |
| JP | 2005-169879 | 6/2005 |
| JP | 2005-193501 | 7/2005 |
| JP | 2011-005685 | 1/2011 |
| JP | 2011-028073 | 2/2011 |

\* cited by examiner

*Primary Examiner* — James Jones
(74) *Attorney, Agent, or Firm* — Workman Nydegger

(57) ABSTRACT

A virtual image emerging ornamental body including: a unit array in which pixel units are disposed; and a condensing element array configured of a plurality of condensing elements which are disposed in positions are associated with the pixel units, in which an arrangement pitch of one side of the pixel units or the condensing elements includes an arrangement pitch having a value of two or more integral multiples of a value which is obtained by adding a predetermined difference to an arrangement pitch of the other side.

9 Claims, 9 Drawing Sheets

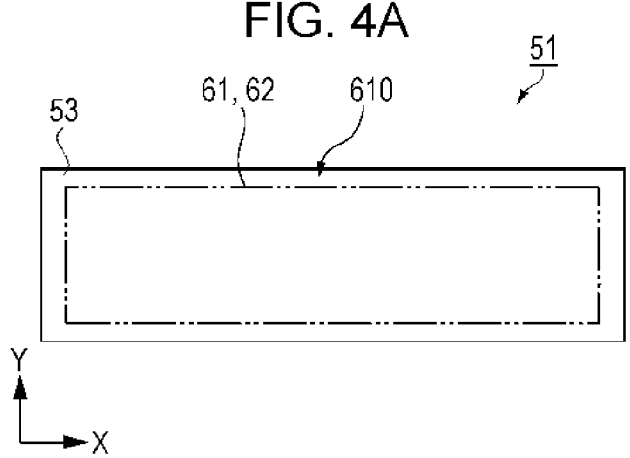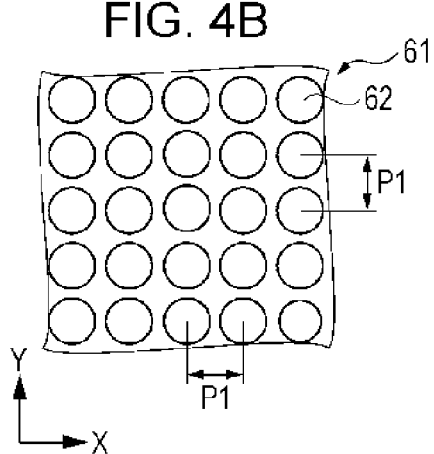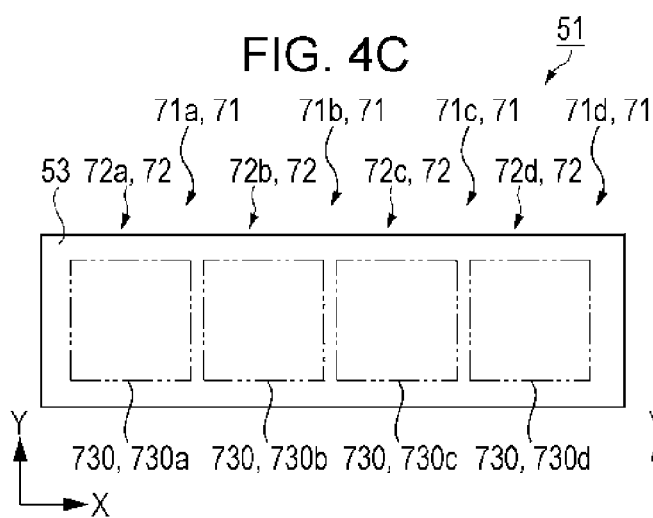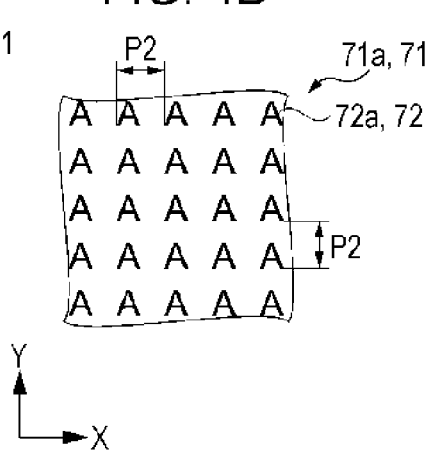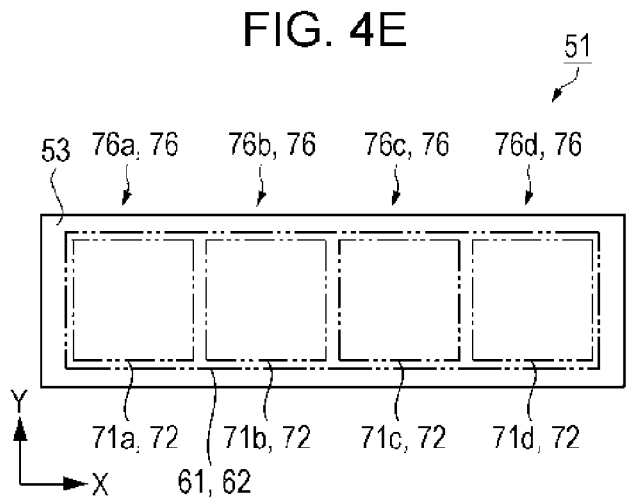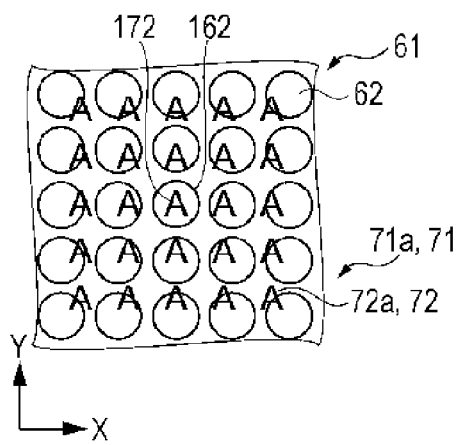

VIRTUAL IMAGE EMERGING ORNAMENTAL BODY AND METHOD FOR MANUFACTURING VIRTUAL IMAGE EMERGING ORNAMENTAL BODY

BACKGROUND

1. Technical Field

The present invention relates to a virtual image emerging ornamental body and a method for manufacturing the virtual image emerging ornamental body which includes pixel units disposed regularly and lens-shaped condensing elements disposed regularly in positions covering the pixel units, and in which the pixel units emerge an enlarged virtual image.

2. Related Art

In the related art, a virtual image emerging ornamental body is known which includes a unit array having pixel units disposed regularly and a condensing element array having lens-shaped condensing elements disposed regularly in positions covering the pixel units, and in which the pixel units emerge an enlarged virtual image.

In JP-A-2005-7593, a virtual image emerging ornamental body is disclosed in which any string can be emerged upward or downward as a virtual image by forming a plano-convex lens-shaped condensing layer configured of lens-shaped condensing elements disposed in a latticed pattern and an image (a unit array) configured of pixels (pixel units) formed to a size of 20% to 80% with respect to a square of the lattice of the condensing elements.

However, the virtual image which can be emerged is an enlarged image of the pixels (the pixel units) and a shape or a color thereof is determined uniformly by the pixels (the pixel units). Therefore, in order to emerge the virtual images which are different in the color thereof, there is a problem that dedicated pixels (pixel units) must be formed for each virtual image which is emerged. In particular, in order to emerge the virtual image of which the color is light, there is a problem that the image of which the color is light needs to be formed and ink of which the color is light needs to be used.

SUMMARY

The invention can be realized in the following forms or application examples.

Application Example 1

According to this application example, there is provided a virtual image emerging ornamental body including: a unit array in which pixel units are disposed; and a condensing element array configured of a plurality of condensing elements which are disposed in positions associated with the pixel units, in which an arrangement pitch of one side of the pixel units or the condensing elements includes an arrangement pitch having a values of two or more integral multiples of a value which is obtained by adding a predetermined difference to an arrangement pitch of the other side.

In this case, one side of the pixel units and condensing elements is disposed with the arrangement pitch of two or more integral multiples of the value which is obtained by adding the predetermined difference to the arrangement pitch of the other side thereof.

The virtual image emerging ornamental body emerges the enlarged virtual image of the pixel units by the condensing elements which are disposed in the positions associated with the pixel units. Each of the condensing elements included in the condensing element array emerges the enlarged virtual image of the pixel units configuring the unit array. However, since the magnification of the virtual image is very large, only a part of the enlarged virtual image of the pixel units can be visible by one condensing element. In the whole condensing element array, a part of the enlarged virtual image emerged by each of the condensing elements included in the condensing element array is visible as one enlarged virtual image as a whole.

Since the arrangement interval of the pixel units or the condensing elements is large which are disposed with the arrangement pitch of two or more integral multiples of the value which is obtained by adding the predetermined difference to the value of the arrangement pitch, the number of which the pixel units or the condensing elements are disposed in the virtual image emerging ornamental body is reduced. Since the number of the pixel units or the condensing elements is reduced, the number of "a part of the enlarged virtual image of the pixel unit which can be visible by one condensing element" is reduced. In other words, the number of "a part of the enlarged virtual image" configuring the virtual image which is visible as one enlarged virtual image is reduced. Thus, in intensity of the color, the virtual image can be emerged to be lighter than the virtual image which is emerged in the virtual image emerging ornamental body configured with substantially the same number of the pixel units and the condensing elements which are disposed. In brightness of the color, the virtual image appearing dark can be emerged.

Application Example 2

In the virtual image emerging ornamental body according to the application example, the pixel units and the condensing elements are preferably disposed in a two-dimensional arrangement so that the factors of the integral multiples are different for each arrangement direction of the two-dimensional arrangement.

In this case, the factors of the integral multiples are different for each arrangement direction of the two-dimensional arrangement. One direction of the arrangement directions of the two-dimensional arrangement is referred to as a line direction and the other direction is referred to as a column direction. In the line direction and the column direction, the number of the pixel units or the condensing elements which are disposed in the arrangement pitch of the integral multiples are proportional to the inverse of the factors of the integral multiple. When the factors in the line direction and the column direction are the same as each other, the number of the pixel units or the condensing elements which are disposed in the two-dimensional arrangement is proportional to the inverse of the square of the factors of the integral multiple. In other words, when the factors of the integral multiple are, for example, two, the number of the pixel units or the condensing elements which are disposed in the two-dimensional arrangement is ¼. The factors in the line direction and the column direction are different from each other so that the factors can be selected individually in the line direction and the column direction. In other words, in one side of the line direction and the column direction, when the factors of the integral multiple are, for example, two, the number of the pixel units or the condensing elements which are disposed in the two-dimensional arrangement is ½. As described above, since the factors in the line direction and the column direction are selected individually, variation of the number of the pixel units or the condensing elements which are disposed in the two-dimensional arrangement can be reduced. Accordingly, the number of the pixel units or the condensing elements can be adjusted delicately. In other words, the intensity of the color or the like of the virtual image which is emerged can be adjusted delicately.

Application Example 3

In the virtual image emerging ornamental body according to the application example, an arrangement pitch of the pixel units preferably includes an arrangement pitch having values of two or more integral multiples of a value which is obtained by adding a predetermined difference to a value of the arrangement pitch of the condensing elements.

In this case, the pixel units are disposed with the arrangement pitch having a value of two or more integral multiples of the value which is obtained by adding the predetermined difference to the value of the arrangement pitch of the condensing elements. When the factors are, for example, two, the arrangement pitch of the pixel units is approximately two times the arrangement pitch of the condensing elements. In this configuration, the pixel units corresponding to approximately half of the condensing elements which are disposed in the positions in which the virtual images of the pixel units can be emerged in a configuration in which the pixel units are disposed with the arrangement pitch which is obtained by adding the predetermined difference to a value of the arrangement pitch of the condensing elements are not present. In other words, the number of "a part of the enlarged virtual images" configuring the virtual image which is visible as one enlarged virtual image is approximately half thereof. As described above, in the intensity of the color, the virtual image can be emerged to be lighter than the virtual image which is emerged in the virtual image emerging ornamental body configured with substantially the same number of the pixel units and the condensing elements which are disposed.

Application Example 4

In the virtual image emerging ornamental body according to the application example, a value of an arrangement pitch of the condensing elements preferably includes an arrangement pitch having values of two or more integral multiples of a value which is obtained by adding a predetermined difference to a value of the arrangement pitch of the pixel units.

In this case, the condensing elements are disposed with the arrangement pitch of two or more integral multiples of a value which is obtained by adding a predetermined difference to a value of the arrangement pitch of the pixel units. When the factors are, for example, two, the arrangement pitch of the condensing elements is approximately two times the arrangement pitch of the pixel units. In this configuration, approximately half of the condensing elements which are disposed in the positions in which the virtual images of the pixel units can be emerged in a configuration in which the pixel units are disposed with the arrangement pitch which is obtained by adding the predetermined difference to the value of the arrangement pitch of the condensing elements are not present. The virtual image of the pixel unit in which the corresponding condensing element is not present is not formed. In other words, the number of "a part of the enlarged virtual images" configuring the virtual image which is visible as one enlarged virtual image is approximately half thereof. As described above, in the intensity of the color, the virtual image can be emerged to be lighter than the virtual image which is emerged in the virtual image emerging ornamental body configured with substantially the same number of the pixel units and the condensing elements which are disposed.

Application Example 5

In the virtual image emerging ornamental body according to the preferred application example, an arrangement pitch of the pixel units preferably includes an arrangement pitch having values of two or more integral multiples of a value which is obtained by adding a predetermined difference to a value of the arrangement pitch of the condensing elements in one arrangement direction of the two-dimensional arrangement, and an arrangement pitch of the condensing elements preferably includes an arrangement pitch having values of two or more integral multiples of a value which is obtained by adding a predetermined difference to a value of the arrangement pitch of the pixel units in the other arrangement direction of the two-dimensional arrangement.

In this case, the number of the pixel units in one arrangement direction of the two-dimensional arrangement is reduced and the number of the condensing elements in the other arrangement direction is reduced. Therefore, in the intensity of the color, the virtual image can be emerged to be lighter than the virtual image which is emerged in the virtual image emerging ornamental body configured with substantially the same number of the pixel units and the condensing elements which are disposed.

Application Example 6

In the virtual image emerging ornamental body according to the application example, preferably further includes: a plurality of virtual image units which are sets of the unit array and the condensing element array, and the factors of the integral multiple are preferably different for each virtual image unit.

In this case, the factors of the integral multiple are different for each virtual image unit. Accordingly, the virtual image of which, for example, the intensity of the color is different for each virtual image unit can be emerged by using the unit array including the same pixel units.

Application Example 7

In the virtual image emerging ornamental body according to the application example, the values of the integral multiples are preferably different depending on locations.

In this case, the values of the integral multiples are preferably different depending on locations. In other words, the arrangement pitches are varied by the locations. When the arrangement pitches are varied, for example, the density of the color of the virtual image which is emerged is varied. Accordingly, in one virtual image, the intensity of the color can be varied partially by using the unit array in which the same pixel units are arranged. In one virtual image, for example, gradation of the intensity of the color can be formed.

Application Example 8

According to this application example, there is provided a method for manufacturing the virtual image emerging ornamental body having a unit array in which pixel units are disposed, and a condensing element array configured of a plurality of condensing elements which are disposed in a position associated with the pixel units, including: disposing at least a part of one side of the pixel units and the condensing elements with an arrangement pitch of two or more integral multiples of a value which is obtained by adding a predetermined difference to an arrangement pitch of the other side thereof; and forming both or one of the pixel units and the condensing elements by using a liquid droplet ejecting apparatus which ejects liquid droplets.

In this case, at least a part of one side of the pixel units and condensing elements is disposed with the arrangement pitch of two or more integral multiples of the value which is obtained by adding the predetermined difference to a value of the arrangement pitch of the other side thereof.

The virtual image emerging ornamental body emerges the enlarged virtual image of the pixel units by the condensing elements which are disposed in the positions associated with the pixel units. Each of the condensing elements included in the condensing element array emerges the enlarged virtual image of the pixel units configuring the unit array. However, since the magnification of the virtual image is very large, only a part of the enlarged virtual image of the pixel units can be visible by one condensing element. In the whole condensing element array, a part of the enlarged virtual image emerged by each of the condensing elements included in the condensing element array is visible as one enlarged virtual image as a whole.

Since the arrangement interval of the pixel units or the condensing elements is large which are disposed with the arrangement pitch of integral multiples of the value which is obtained by adding the predetermined difference to the value of the arrangement pitch, the number of the pixel units or the condensing elements which is disposed in the virtual image emerging ornamental body is reduced. Since the number of the pixel units or the condensing elements is reduced, the number of "a part of the enlarged virtual image of the pixel unit which can be visible by one condensing element" is reduced. In other words, the number of "a part of the enlarged virtual image" configuring the virtual image which is visible as one enlarged virtual image is reduced. Thus, a virtual image emerging ornamental body can be manufactured in which the virtual image can be emerged to be lighter than the virtual image which is emerged in the virtual image emerging ornamental body configured with substantially the same number of the pixel units and the condensing elements which are disposed in intensity of the color. The virtual image emerging ornamental body can be manufactured in which the virtual image appearing dark can be emerged in brightness of the color.

In addition, both or one side of pixel units and the condensing elements is formed by using the liquid droplet ejecting apparatus. In other words, the pixel units, which are disposed with a predetermined positional relationship, are drawn by using the liquid droplet ejecting apparatus. The liquid droplets having precise volumes can be positioned in correct positions by using the liquid droplet ejecting apparatus. Therefore, the pixel units having the precise shapes which are disposed with a correct positional relationship can be formed. In addition, the condensing elements, which are disposed with the predetermined positional relationship, are drawn by using the liquid droplet ejecting apparatus. Therefore, the condensing elements having precise shapes which are disposed with a correct positional relationship can be formed. Furthermore, since the arrangement pitch can be easily varied by using the liquid droplet ejecting apparatus, the virtual image emerging ornamental body including the condensing element array or the unit array having different arrangement pitches can be easily formed.

BRIEF DESCRIPTION OF THE DRAWINGS

The invention will be described with reference to the accompanying drawings, wherein like numbers reference like elements.

FIG. 4A is a plan view illustrating a configuration of a lens array of the virtual image emerging ornamental body.

FIG. 4B is an enlarged plan view of the lens array.

FIG. 4C is a plan view illustrating a configuration of a pixel array of the virtual image emerging ornamental body.

FIG. 4D is an enlarged plan view of one pixel array.

FIG. 4E is a plan view illustrating a configuration of the lens array and the pixel array of the virtual image emerging ornamental body.

FIG. 4F is an enlarged plan view of the lens array and the pixel array illustrated in FIG. 4D.

DESCRIPTION OF EXEMPLARY EMBODIMENTS

Figure 1A:
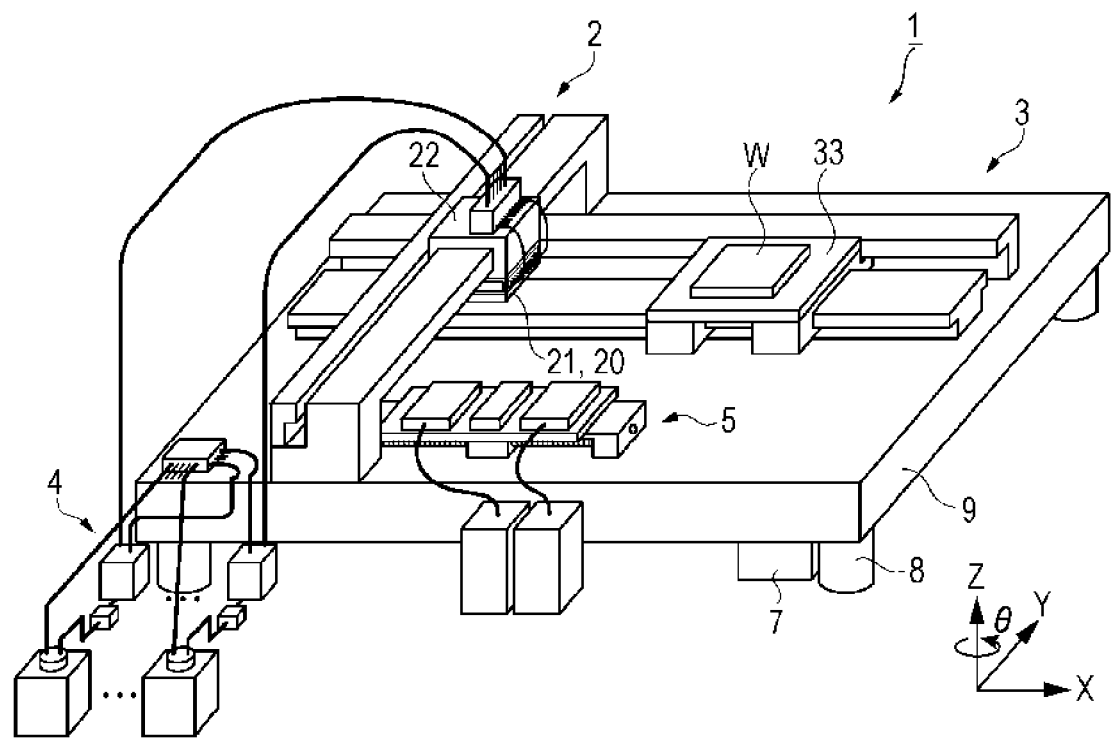
FIG. 1A is an external perspective view illustrating a schematic configuration of an overall liquid droplet ejecting apparatus.

Hereinafter, an embodiment of a virtual image emerging ornamental body and a method for manufacturing the virtual image emerging ornamental body will be described with reference to the drawings. In addition, in the drawings referred in the following description, vertical and horizontal scales of members or parts may be different from actual scales for the convenience of illustration.

Liquid Droplet Ejecting Apparatus

Figure 1B:
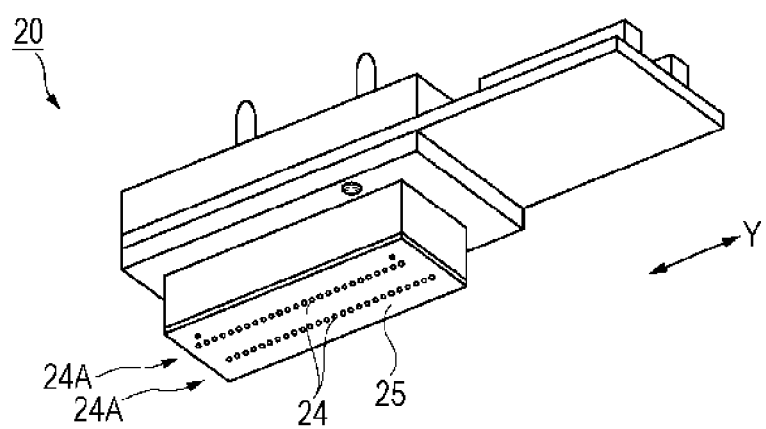
FIG. 1B is an external perspective view illustrating a schematic configuration of a liquid droplet ejecting head included in the liquid droplet ejecting apparatus.

First, a liquid droplet ejecting apparatus 1 will be described with reference to FIGS. 1A and 1B. FIGS. 1A and 1B are external perspective views illustrating a schematic configuration of the liquid droplet ejecting apparatus. FIG. 1A is the external perspective view illustrating the schematic configuration of an overall liquid droplet ejecting apparatus and FIG. 1B is the external perspective view illustrating the schematic configuration of a liquid droplet ejecting head included in the liquid droplet ejecting apparatus.

As illustrated in FIGS. 1A and 1B, the liquid droplet ejecting apparatus 1 includes a head mechanism section 2, a work mechanism section 3, a functional liquid supply section 4, a maintenance device section 5 and an ejecting device control section 7. The head mechanism section 2 includes a liquid droplet ejecting head 20 ejecting the functional liquid as liquid droplets. Furthermore, the head mechanism section 2 has an ultraviolet irradiation section (not illustrated). The work mechanism section 3 includes a work mounting table 33 on which a work W is mounted which is an ejection subject (a drawing subject) of the liquid droplets ejected from the liquid droplet ejecting head 20. The functional liquid supply section 4 supplies the functional liquid to the liquid droplet ejecting head 20. The maintenance device section 5 performs maintenance of the liquid droplet ejecting head 20. The ejecting device control section 7 collectively controls each of mechanism sections and the like. Furthermore, the liquid droplet ejecting apparatus 1 includes a plurality of support legs 8 which are provided on the floor and a surface plate 9 which is provided above the support legs 8.

The work mechanism section 3 is disposed on the upper surface of the surface plate 9. The work mechanism section 3 extends in a longitudinal direction (an X-axis direction) of the surface plate 9. The head mechanism section 2 which is supported by two support posts fixed to the surface plate 9 is disposed above the work mechanism section 3. The head mechanism section 2 extends in a direction (a Y-axis direction) substantially orthogonal to the work mechanism section 3. A functional liquid tank of the functional liquid supply section 4 having supply pipes communicating with the liquid droplet ejecting head 20 of the head mechanism section 2 or the like is disposed in the vicinity of the surface plate 9. The maintenance device section 5 is disposed in the vicinity of the support post of one side of the head mechanism section 2 by extending in the X-axis direction along with the work mechanism section 3. Furthermore, the ejecting device control section 7 is stored below the surface plate 9.

The head mechanism section 2 includes a head unit 21 having the liquid droplet ejecting head 20 and a head carriage 22 supporting the head unit 21. The liquid droplet ejecting head 20 is freely moved in the Y-axis direction by moving the head carriage 22 in the Y-axis direction. In addition, the liquid droplet ejecting head 20 is held in the moved position. The work mechanism section 3 freely moves the work W mounted on the work mounting table 33 in the X-axis direction by moving the work mounting table 33 in the X-axis direction. In addition, the work W is held in the moved position.

The liquid droplet ejecting head 20 is moved and stopped at an ejecting position in the Y-axis direction, and the functional liquid is ejected as the liquid droplets in synchronization with the movement of work W which is at the bottom in the X-axis direction. The X-axis direction which is a relative movement direction (a scanning direction) between the liquid droplet ejecting head 20 and the work W, and accompanied by ejecting of the functional liquid from the liquid droplet ejecting head 20 is referred to as an ejection scanning direction.

The liquid droplets are landed in any position on the work W by relatively controlling the work W which is moved in the X-axis direction and the liquid droplet ejecting head 20 which is moved in the Y-axis direction. Accordingly, it is possible to perform desired drawing.

As illustrated in FIG. 1B, the liquid droplet ejecting head 20 includes a nozzle substrate 25. The nozzle substrate 25 has two nozzle columns 24A parallel to each other in which a plurality of ejecting nozzles 24 are arranged in a substantially linear shape. The functional liquid is ejected as the liquid droplets from the ejecting nozzles 24 and the liquid droplets are landed in the work W or the like which is in a facing position thereof thereby disposing the functional liquid in the position. The nozzle column 24A extends in the Y-axis direction illustrated in FIG. 1A in a state where the liquid droplet ejecting head 20 is mounted on the liquid droplet ejecting apparatus 1. The ejecting nozzles 24 are arranged with an equally spaced nozzle pitch in the nozzle column 24A and the positions of the ejecting nozzles 24 are shifted from each other by half nozzle pitch in the Y-axis direction between two columns of the nozzle column 24A. Accordingly, the liquid droplet ejecting head 20 can dispose the liquid droplets of the functional liquid with intervals of half nozzle pitch in the Y-axis direction.

In order to widen the drawing range in the Y-axis direction, the liquid droplet ejecting heads 20 may be arranged in the Y-axis direction. In addition, the movement of work W in the X-axis direction and the ejection from the liquid droplet ejecting head 20 may be performed for each position of the liquid droplet ejecting head 20 in the Y-axis direction by moving the liquid droplet ejecting head 20 in the Y-axis direction.

In order to reduce the arrangement pitch of the liquid droplets in the Y-axis direction, a plurality of liquid droplet ejecting heads 20 may be arranged parallel to each other in the X-axis direction by shifting the positions of the ejecting nozzles 24 to each other in the Y-axis direction and the liquid droplet ejecting head including three or more nozzle columns may be used. Of course, it is also possible to use the liquid droplet ejecting head having a small nozzle pitch if such a liquid droplet ejecting head can be manufactured.

Landing Position

Figure 2A:
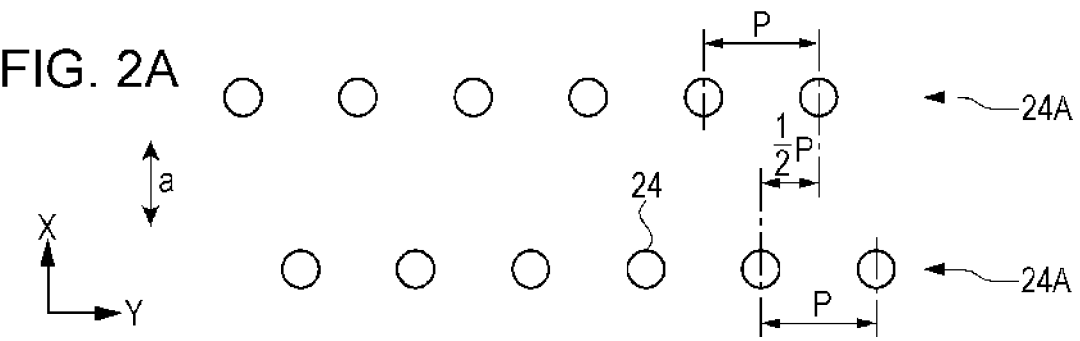
FIG. 2A is an explanatory view illustrating an arrangement position of ejecting nozzles.
Figure 2B:
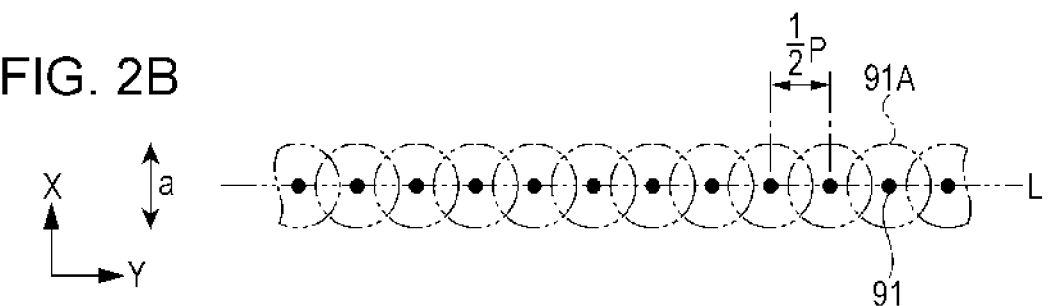
FIG. 2B is an explanatory view illustrating a state where liquid droplets are linearly landed in an extending direction of a nozzle column.
Figure 2C:
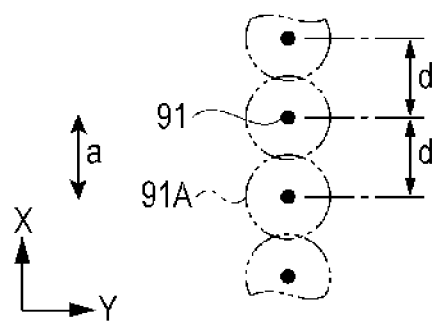
FIG. 2C is an explanatory view illustrating a state where the liquid droplets are linearly landed in an ejection scanning direction.
Figure 2D:
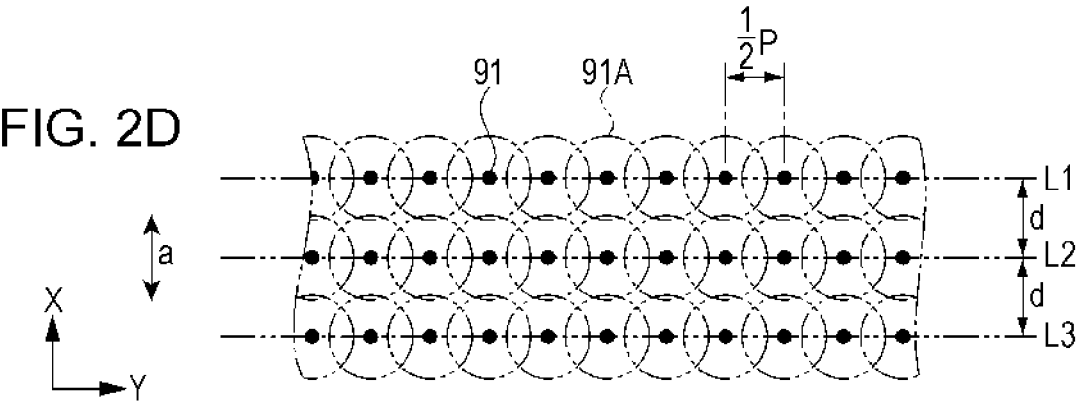
FIG. 2D is an explanatory view illustrating a state where the liquid droplets are landed in planar shape.

Next, a relationship between the ejecting nozzle 24 of the liquid droplet ejecting head 20 and a landing position of the liquid droplet ejected from each ejecting nozzle 24 will be described with reference to FIGS. 2A to 2D. FIGS. 2A to 2D are explanatory views illustrating a relationship between the ejecting nozzle and the landing position of the liquid droplet ejected from each ejecting nozzle. FIG. 2A is an explanatory view illustrating the arrangement position of the ejecting nozzles, FIG. 2B is an explanatory view illustrating a state where liquid droplets are linearly landed in an extending direction of the nozzle column, FIG. 2C is an explanatory view illustrating a state where the liquid droplets are linearly landed in the ejection scanning direction and FIG. 2D is an explanatory view illustrating a state where the liquid droplets are landed in planar shape. The X-axis direction and the Y-axis direction illustrated in FIGS. 2A to 2D coincide with the X-axis direction or the Y-axis direction illustrated in FIG. 1 in a state where the head unit 21 is mounted on the liquid droplet ejecting apparatus 1. The X-axis direction is the ejection scanning direction and the liquid droplets can be landed in any position in the X-axis direction by ejecting the liquid droplets of the functional liquid in any position while relatively moving the ejecting nozzles 24 (the liquid droplet ejecting head 20) in an arrow direction a illustrated in FIGS. 2A to 2D.

As illustrated in FIG. 2A, the ejecting nozzles 24 configuring the nozzle column 24A are arranged with a distance between centers of the nozzle pitch P in the Y-axis direction. As described above, the positions of the ejecting nozzles 24 configuring two nozzle columns 24A, respectively are shifted by ½ of the nozzle pitch P one another in the Y-axis direction.

As illustrated in FIG. 2B, a state of one liquid droplet which is landed is illustrated by a landing point 91 illustrating the landing position and a landing circle 91A illustrating a wetted and spread state of the liquid droplet which is landed. A pattern in which the landing circles 91A are linearly connected to each other with the interval between the centers of ½ of the nozzle pitch P is formed by ejecting the liquid droplets, respectively when liquid droplets are landed on an imaginary line L illustrated in a two-dot chain line in FIG. 2B from overall ejecting nozzles 24 of the two nozzle columns 24A.

As illustrated in FIG. 2C, a pattern in which the landing circles 91A are linearly connected to each other in the X-axis direction is formed by continuously ejecting the liquid droplets from one ejecting nozzle 24. A minimum value of the distance between the centers of the landing points 91 in the X-axis direction is referred to as a minimum landing distance d. The product of a relative movement speed and a minimum ejecting interval (time) of the ejecting nozzle 24 is the minimum landing distance d in X-axis direction.

As illustrated in FIG. 2D, a landing surface in which the straight lines in which the landing circles 91A are continuous with the interval between the centers of ½ of the nozzle pitch P are parallel to each other in the X-axis direction is formed by ejecting the liquid droplets, respectively when the liquid droplets are landed on imaginary lines L1, L2 and L3 illustrated in two-dot chain lines. Each of the landing points 91 is a position in which the liquid droplets of the functional liquid are able to be arranged by the liquid droplet ejecting apparatus 1, in a case where the distance between the imaginary lines L1, L2 and L3 illustrated in FIG. 2D is the minimum landing distance d.

The positions on which the liquid droplets are arranged are set for the positions of the landing points 91, respectively, illustrated in FIG. 2D according to the information of the image when drawing the image. For example, a pixel arrangement drawing which sets the arrangement position and the ejecting nozzles 24 ejecting the liquid droplets on the arrangement position is formed and the image defined by the information of the image is drawn by landing the functional liquid according to the pixel arrangement drawing. In addition, in the example illustrated in FIG. 2D, a gap is present between the landing circles 91A; however, the functional liquid may be arranged without a gap and a lump grown by hardening the functional liquid may also be formed by appropriately setting an ejection weight for one droplet of the liquid droplets which are ejected with respect to the nozzle pitch P or the minimum landing distance d. Of course, the liquid droplet of one droplet may be arranged independently without overlapping with other liquid droplets.

Virtual Image Emerging Ornamental Body

Figure 3A:
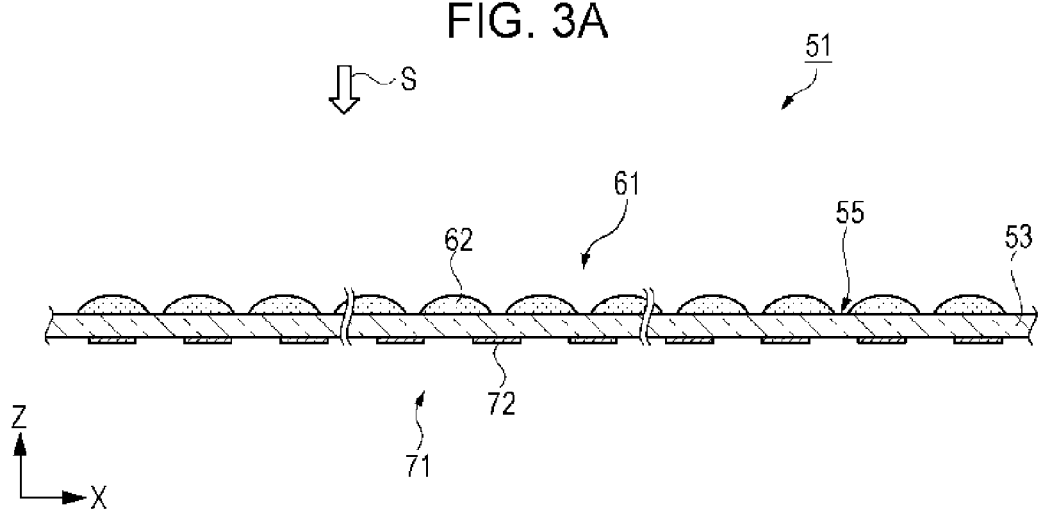
FIG. 3A is a cross-sectional view illustrating a main portion of a configuration of a virtual image emerging ornamental body.
Figure 3B:
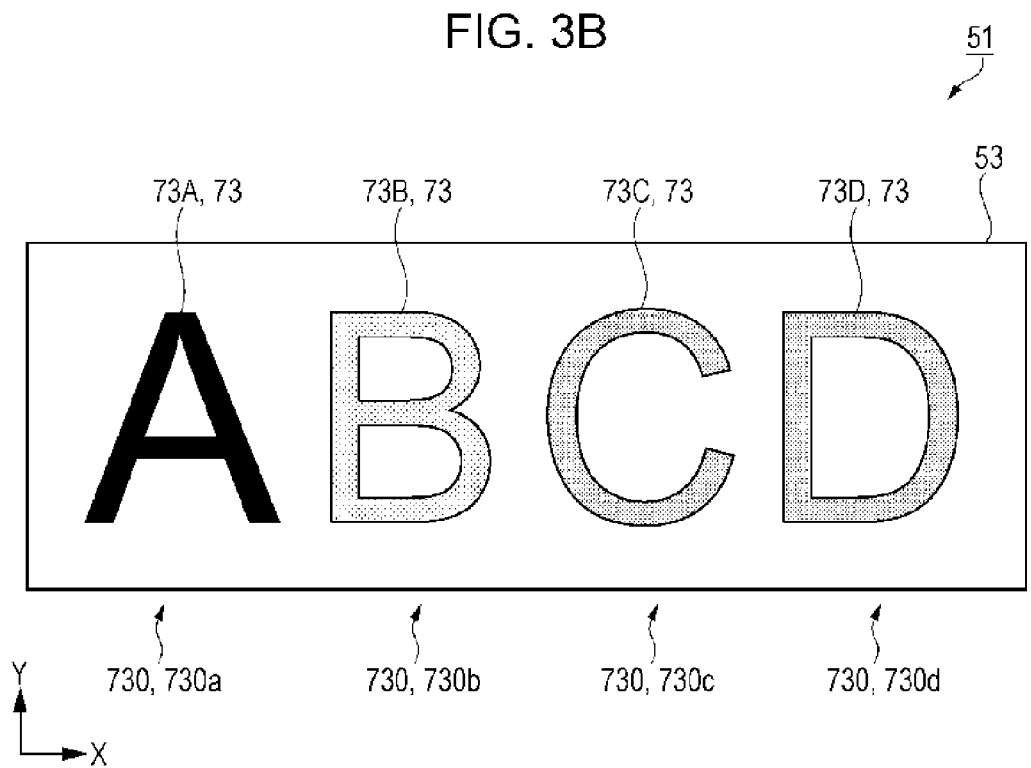
FIG. 3B is a schematic plan view illustrating a virtual image formed on the virtual image emerging ornamental body.

Next, a configuration of the virtual image emerging ornamental body including the pixel array having the pixel unit and the lens array having the micro-lenses will be described with reference to FIGS. 3A and 3B, and FIGS. 4A to 4F. FIGS. 3A and 3B are schematic views illustrating the configuration of the virtual image emerging ornamental body. FIG. 3A is a cross-sectional view illustrating a main portion of the configuration of the virtual image emerging ornamental body and FIG. 3B is a schematic plan view illustrating a virtual image formed on the virtual image emerging ornamental body. FIGS. 4A to 4F are schematic views illustrating the configuration of elements configuring the virtual image emerging ornamental body. FIG. 4A is a plan view illustrating a configuration of the lens array of the virtual image emerging ornamental body, FIG. 4B is an enlarged plan view of the lens array, FIG. 4C is a plan view illustrating a configuration of the pixel array of the virtual image emerging ornamental body, FIG. 4D is an enlarged plan view of one pixel array, FIG. 4E is a plan view illustrating a configuration of the lens array and the pixel array of the virtual image emerging ornamental body and FIG. 4F is an enlarged plan view of the lens array and the pixel array illustrated in FIG. 4D.

As illustrated in FIG. 3A, a virtual image emerging ornamental body 51 includes a base member 53, a lens array 61 and a pixel array 71. The base member 53 is a film-shaped member formed by a transparent material. The material of the base member 53 may include polyethylene (PE), polypropylene (PP), polyethylene terephthalate (PET), polycarbonate (PC), polyvinyl chloride (PVC), polyvinyl alcohol (PVA) or the like.

A liquid repellent layer 55 is formed on one surface of the base member 53. Micro-lenses 62 configuring the lens array 61 are formed on the liquid repellent layer 55. The micro-lenses 62 can be formed by arranging a functional liquid which includes the material of the micro-lenses 62 to form predetermined-shape in a plan view, by predetermined amount and in a predetermined position using the liquid droplet ejecting apparatus 1 described above.

Pixel units 72 configuring the pixel array 71 are formed on a surface opposite to the surface on which the liquid repellent layer 55 of the base member 53 is formed. The pixel units 72 can be formed by arranging the liquid droplets of the functional liquid in predetermined positions and by drawing a predetermined shape using the liquid droplet ejecting apparatus 1 described above.

As illustrated in FIG. 3B, pixel virtual images 73 are visible when viewed from an arrow direction is illustrated in FIG. 3A. A letter A, a letter B, a letter C and a letter D are exemplified as the pixel virtual images 73 in FIG. 3B. The pixel virtual images 73 having the shape of the letter A, the letter B, the letter C or the letter D are referred to as a pixel virtual image 73A, a pixel virtual image 73B, a pixel virtual image 73C or a pixel virtual image 73D. A region in which one pixel virtual image 73 is formed is referred to as a virtual image region 730. The virtual image regions 730 in which the pixel virtual image 73A, the pixel virtual image 73B, the pixel virtual image 73C or the pixel virtual image 73D are formed are referred to as a virtual image region 730a, a virtual image region 730b, a virtual image region 730c or a virtual image region 730d.

The lens array 61 is configured such that the micro-lenses 62 are arranged in a reticular pattern with an equal pitch interval. A set of the micro-lenses 62 formed on one virtual image region 730 is referred to as the lens array 61 and a set of the micro-lenses 62 formed on the overall virtual image emerging ornamental body 51 is referred to as a lens array 610. The lens array 610 is formed in a region illustrated in a two-dot chain line in FIG. 4A. As illustrated in FIG. 4B, the lens array 61 is configured such that the micro-lenses 62 are disposed vertically and horizontally with a pitch P1. In the lens array 61, for example, 2025 micro-lenses 62 are formed with 45 lines×45 columns. For example, the pitch P1 is 180 µm.

A region surrounded by a two-dot chain line in FIG. 4C illustrates the one virtual image region 730. One pixel array 71 is formed on the one virtual image region 730. The pixel arrays 71 formed in the virtual image region 730a, the virtual image region 730b, the virtual image region 730c or the virtual image region 730d are referred to as an A pixel array 71a, a B pixel array 71b, a C pixel array 71c or a D pixel array 71d. As illustrated in FIG. 4D, in the A pixel array 71a, the pixel units 72 are disposed vertically and horizontally with a pitch P2. The pitch P1 and the pitch P2 are set in values to satisfy a relationship of the pitch P1×(the number of lines or the number of columns of the micro-lenses 62 in the lens array 61-1)=the pitch P2×(the number of lines or the number of columns of the pixel units 72 in the pixel array 71). The pixel array 71 illustrated in FIG. 4D is the A pixel array 71a and pixel units 72a having a substantially similar shape as the pixel virtual image 73A are disposed with the pitch P2. In the B pixel array 71b, the C pixel array 71c and the D pixel array 71d illustrated in FIG. 4C, pixel units 72b, pixel units 72c or pixel units 72d having a substantially similar shape as the pixel virtual image 73B, the pixel virtual image 73C or the pixel virtual image 73D are disposed. The arrangement of the pixel units 72b, the pixel units 72c or the pixel units 72d in the pixel virtual image 73B, the pixel virtual image 73C or the pixel virtual image 73D is described below in detail.

In the A pixel array 71a, for example, 2025 pixel units 72a are formed with 45 lines×45 columns. For example, the pitch P2 is 176 µm.

As illustrated in FIG. 4E, in the virtual image emerging ornamental body 51, the lens arrays 61 and the pixel arrays 71 are formed by overlapping each other in a direction parallel to the surface of the base member 53. A set of the lens array 61 emerging the pixel virtual image 73 and the pixel array 71 is referred to as a virtual image unit 76. The virtual image units 76 emerging the pixel virtual image 73A, the pixel virtual image 73B, the pixel virtual image 73C or the pixel virtual image 73D are referred to as a virtual image unit 76a, a virtual image unit 76b, a virtual image unit 76c or a virtual image unit 76d.

As illustrated in FIG. 4F, in the virtual image unit 76 (the virtual image unit 76a), the center of a micro-lens 162 of the lens array 61 and the center of a pixel unit 172 of the pixel array 71 are consistent with each other. The micro-lens 162 is the micro-lens 62 of the center of the lens array 61 and the pixel unit 172 is the pixel unit 72 of the center of the pixel array 71. The center positions of the micro-lens 62 next to the micro-lens 162 and the pixel unit 72 next to the pixel unit 172 are shifted by an amount (a predetermined difference) corresponding to the difference between the pitch P1 and the pitch P2. When the pitch P1 is 180 µm and the pitch P2 is 174 µm, 4 µm corresponds to the predetermined difference. The pitches P1 and P2 or the predetermined difference is not limited to these values and can be appropriately set depending on desired visual effects or the like.

In an end of the virtual image unit 76, the center position of the pixel unit 72 configuring the line or the column of the end in the line or the column of the pixel unit 72 included in the pixel array 71 is positioned in the center point between the center position of the micro-lens 62 configuring the line or the column of the end in the line or the column of the micro-lens 62 included in the lens array 61 and the center position of the micro-lens 62 configuring the second line or the column from the end thereof.

The pixel array 71 corresponds to a unit array. The micro-lens 62 corresponds to a condensing element. The lens array 61 corresponds to a condensing element array.

In the virtual image emerging ornamental body 51 which is configured as described above, an enlarged virtual image of a part of the pixel unit 72 is formed by the micro-lens 62 corresponding to the pixel unit 72. Since the pitch P1 and the pitch P2 are shifted from each other by a predetermined difference, portions of the pixel units 72 formed as the enlarged virtual images are different from each other for each micro-lens 62 corresponding to the pixel units 72 in the virtual image unit 76. Thus, in the virtual image unit 76, the pixel virtual image 73 in which the pixel unit 72 is enlarged by the lens array 61 including the micro-lenses 62 is visibly formed.

Pixel Array

Figure 5A:
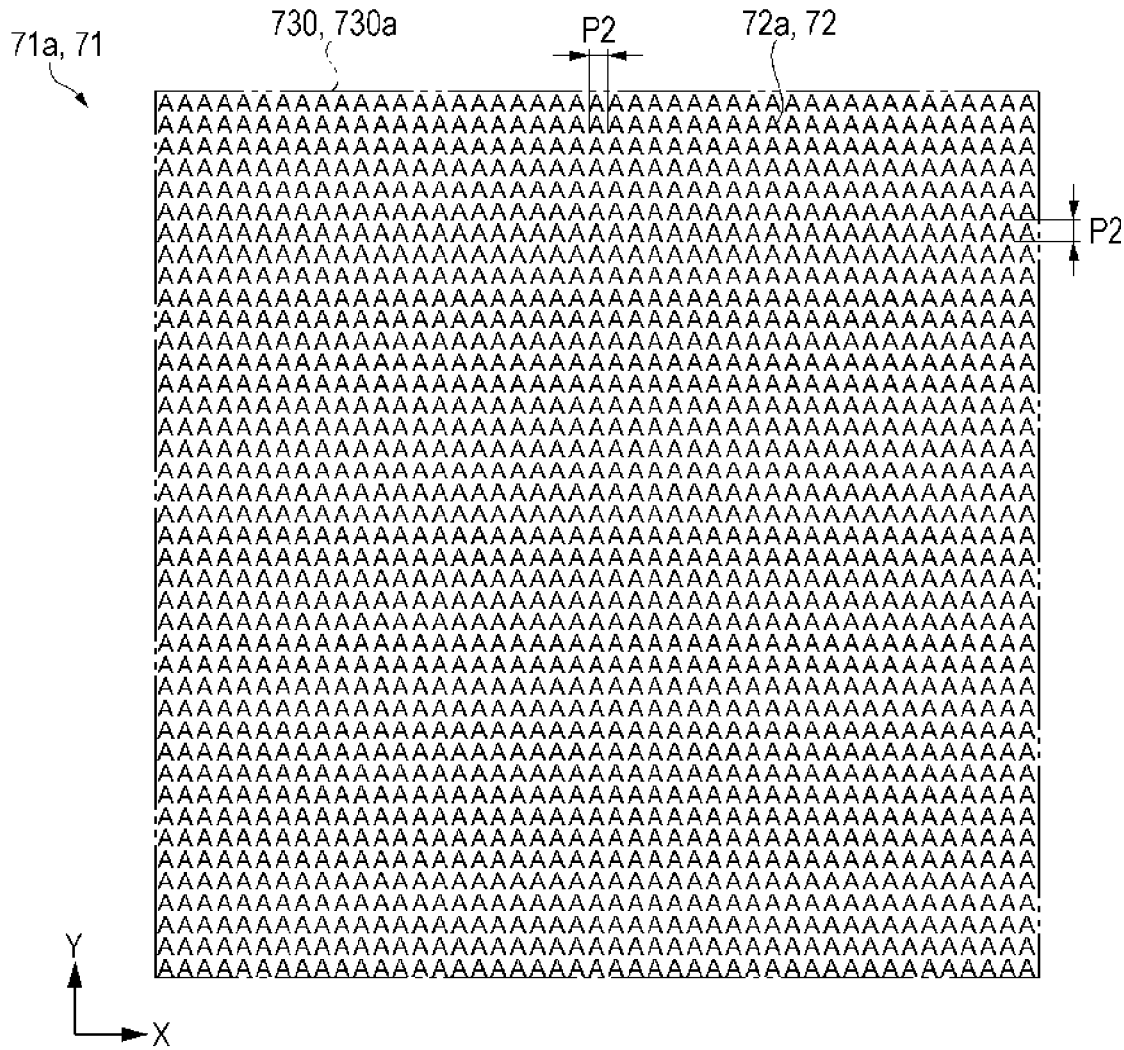
FIG. 5A is a plan view illustrating a configuration of an A pixel array.
Figure 5B:
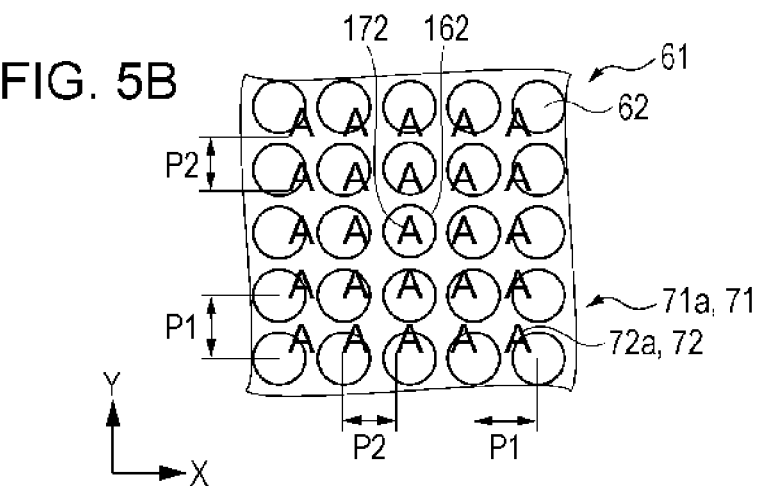
FIG. 5B is an enlarged plan view illustrating a configuration of a virtual image unit including the A pixel array.
Figure 6A:
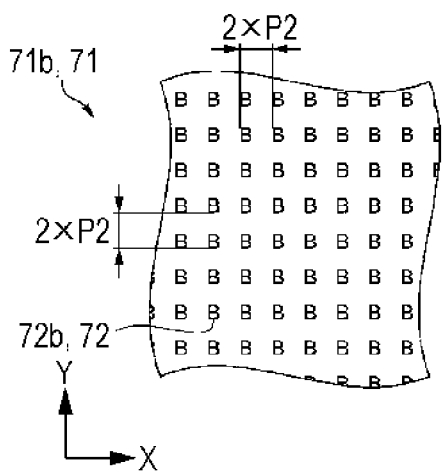
FIG. 6A is a plan view illustrating a configuration of a B pixel array.
Figure 6B:
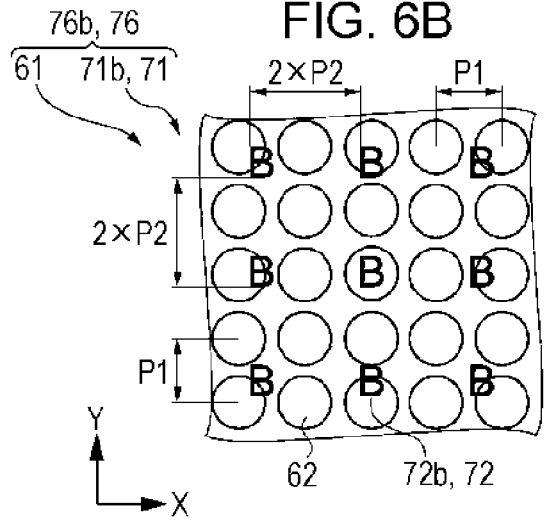
FIG. 6B is an enlarged plan view illustrating a configuration of the virtual image unit including the B pixel array.
Figure 6C:
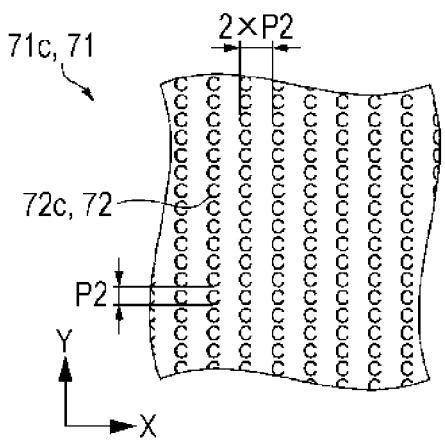
FIG. 6C is a plan view illustrating a configuration of a C pixel array.
Figure 6D:
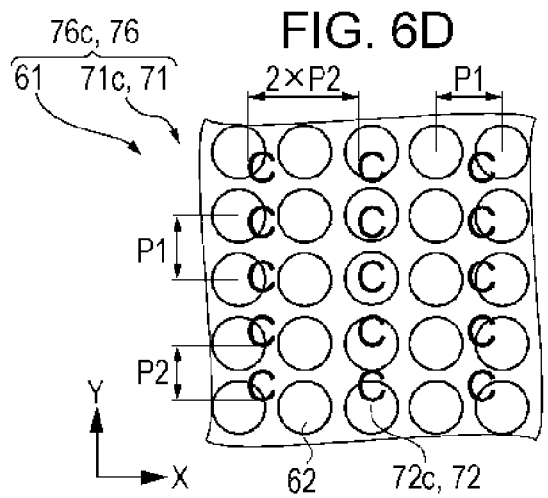
FIG. 6D is an enlarged plan view illustrating a configuration of the virtual image unit including the C pixel array.
Figure 6E:
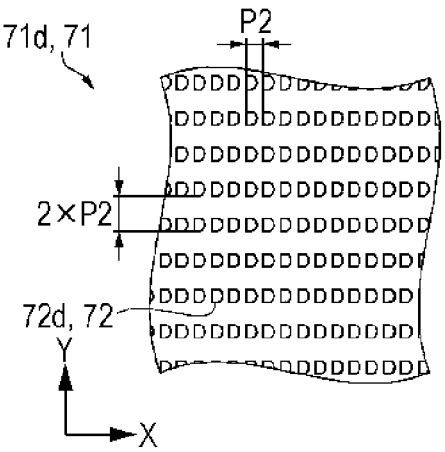
FIG. 6E is a plan view illustrating a configuration of a D pixel array.
Figure 6F:
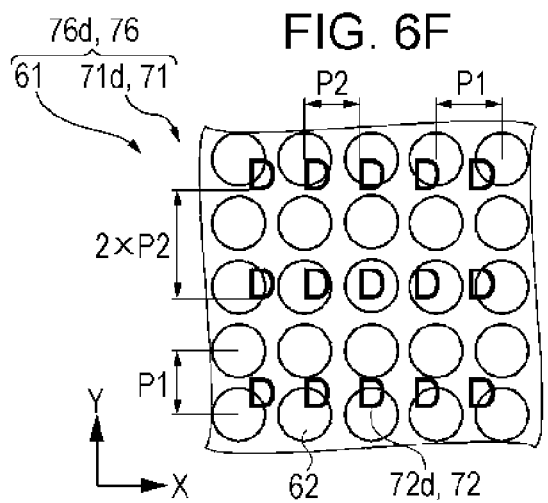
FIG. 6F is an enlarged plan view illustrating a configuration of the virtual image unit including the D pixel array.

Next, a configuration of the pixel array 71 included in the virtual image emerging ornamental body 51 will be described with reference to FIGS. 5A and 5B, and FIGS. 6A to 6F. FIGS. 5A and 5B are schematic views illustrating a configuration of the A pixel array. FIG. 5A is a plan view illustrating the configuration of the A pixel array and FIG. 5B is an enlarged plan view illustrating the configuration of the virtual image unit including the A pixel array. FIGS. 6A to 6F are schematic views illustrating the configuration of the pixel array. FIG. 6A is a plan view illustrating a configuration of the B pixel array, FIG. 6B is an enlarged plan view illustrating a configuration of the virtual image unit including the B pixel array, FIG. 6C is a plan view illustrating a configuration of the C pixel array, FIG. 6D is an enlarged plan view illustrating a configuration of the virtual image unit including the C pixel array, FIG. 6E is a plan view illustrating a configuration of the D pixel array and FIG. 6F is an enlarged plan view illustrating a configuration of the virtual image unit including the D pixel array.

As illustrated in FIG. 5A and as described above, the pixel unit 72a of the A pixel arrays 71a are disposed vertically and horizontally with the pitch P2.

A figure illustrated in FIG. 5B is the same as the figure illustrated in FIG. 4F. As described with reference to FIG. 4F, an enlarged virtual image of a part of the pixel unit 72 is formed by the micro-lens 62 corresponding to the pixel unit 72a. The pixel virtual image 73A in which the pixel unit 72a is enlarged by the micro-lens 62 is visibly formed in the virtual image unit 76a. The pixel virtual image 73A is an array of the enlarged virtual images of a part of the pixel units 72a formed by the micro-lenses 62.

As illustrated in FIG. 6A, in the B pixel arrays 71b included in the virtual image unit 76b, the pixel units 72b are disposed vertically and horizontally with a pitch (2×P2). In the A pixel array 71a, when 2025 pixel units 72a are formed with 45 lines×45 columns, in the B pixel array 71b, 529 pixel units 72b are formed with 23 lines×23 columns. For example, the pitch (2×P2) is 352 µm.

As described above, the micro-lenses 62 of the lens array 61 included in the virtual image unit 76b are included in the lens array 610 that is the same as the lens array 61 included in the virtual image unit 76a. As illustrated in FIG. 6B, the micro-lenses 62 of the lens array 61 included in the virtual image unit 76b are disposed with the arrangement pitch P1. As described above, for example, the pitch P1 is 180 µm.

Similar to the virtual image unit 76a, in the virtual image unit 76b, an enlarged virtual image of a part of the pixel unit 72b is formed by the micro-lens 62 corresponding to the pixel unit 72b. In the virtual image unit 76b, the pixel virtual image 73B in which the pixel unit 72b is enlarged by the lens array 61 is visibly formed. The pixel virtual image 73B is an array of the enlarged virtual images of a part of the pixel units 72b formed by the micro-lenses 62.

However, the pixel units 72b included in the B pixel array 71b are disposed vertically and horizontally with the pitch (2×P2). In other words, the number of the enlarged virtual images of a part of the pixel units 72b configuring the pixel virtual images 73B is approximately ¼ of the number of the enlarged virtual images of a part of the pixel units 72a configuring the pixel virtual images 73A. Thus, when the pixel unit 72a and the pixel unit 72b have the same color, the pixel virtual image 73B is viewed, for example, lighter than the pixel virtual image 73A.

As illustrated in FIG. 6C, the C pixel array 71c included in the virtual image unit 76c is configured such that the pixel units 72c are disposed with the pitch (2×P2) of the arrangement pitch in the X-axis direction and the pitch P2 of the arrangement pitch in the Y-axis direction. In the A pixel array 71a, when 2025 pixel units 72a are formed with 45 lines×45 columns, in the C pixel array 71c, 1035 pixel units 72c are formed with 45 lines×23 columns. For example, the pitch P2 is 176 μm and the pitch (2×P2) is 352 μm.

As described above, the micro-lenses 62 of the lens array 61 included in the virtual image unit 76c are included in the lens array 610 that is the same as the lens array 61 included in the virtual image unit 76a. As illustrated in FIG. 6D, the micro-lenses 62 of the lens array 61 included in the virtual image unit 76c are disposed with the arrangement pitch P1. As described above, for example, the pitch P1 is 180 μm.

Similar to the virtual image unit 76a, in the virtual image unit 76c, an enlarged virtual image of a part of the pixel unit 72c is formed by the micro-lens 62 corresponding to the pixel unit 72c. In the virtual image unit 76c, the pixel virtual image 73C in which the pixel unit 72c is enlarged by the lens array 61 is visibly formed. The pixel virtual image 73C is an array of the enlarged virtual images of a part of the pixel units 72c formed by the micro-lenses 62.

However, the pixel units 72c included in the C pixel array 71c are disposed with the pitch (2×P2) in the X-axis direction and the pitch P2 in the Y-axis direction. Therefore, the number of the enlarged virtual images of a part of the pixel units 72c configuring the pixel virtual images 73C is approximately ½ of the number of the enlarged virtual images of a part of the pixel units 72a configuring the pixel virtual images 73A and is approximately 2 times the number of the enlarged virtual images of a part of the pixel units 72b configuring the pixel virtual images 73B. Thus, when the pixel unit 72c, the pixel unit 72a and the pixel units 72b have the same color, color density of the pixel virtual image 73C is in the middle of that of the pixel virtual image 73A and the pixel virtual image 73B.

As illustrated in FIG. 6E, the D pixel arrays 71d included in the virtual image unit 76d are configured such that the pixel units 72d are disposed with the pitch P2 of the arrangement pitch in the X-axis direction and the pitch (2×P2) of the arrangement pitch in the Y-axis direction. In the A pixel array 71a, when 2025 pixel units 72a are formed with 45 lines×45 columns, in the D pixel array 71d, 1035 pixel units 72d are formed with 23 lines×45 columns. For example, the pitch P2 is 176 μm and the pitch (2×P2) is 352 μm.

As described above, the micro-lenses 62 of the lens array 61 included in the virtual image unit 76d are included in the lens array 610 that is the same as the lens array 61 included in the virtual image unit 76a. As illustrated in FIG. 6F, the micro-lenses 62 of the lens array 61 included in the virtual image unit 76d are disposed with the arrangement pitch P1. As described above, for example, the pitch P1 is 180 μm.

Similar to the virtual image unit 76a and the like, an enlarged virtual image of a part of the pixel unit 72d is formed by the micro-lens 62 corresponding to the pixel unit 72d in the virtual image unit 76d. In the virtual image unit 76d, the pixel virtual image 73D in which the pixel unit 72d is enlarged by the lens array 61 is visibly formed. The pixel virtual image 73D is an array of the enlarged virtual images of a part of the pixel units 72d formed by the micro-lenses 62.

However, the pixel units 72d included in the D pixel array 71d are disposed with the pitch P2 in the X-axis direction and the pitch (2×P2) in the Y-axis direction. Therefore, the number of the enlarged virtual images of a part of the pixel units 72d configuring the pixel virtual images 73D is approximately ½ of the number of the enlarged virtual images of a part of the pixel units 72a configuring the pixel virtual images 73A and is approximately 2 times the number of the enlarged virtual images of a part of the pixel units 72b configuring the pixel virtual images 73B. Thus, when the pixel unit 72c, the pixel unit 72a and the pixel unit 72d have the same color, color intensity of the pixel virtual image 73D is in the middle of that of the pixel virtual image 73A and the pixel virtual image 73B.

Other Examples of Virtual Image Emerging Ornamental Body

Figure 7A:
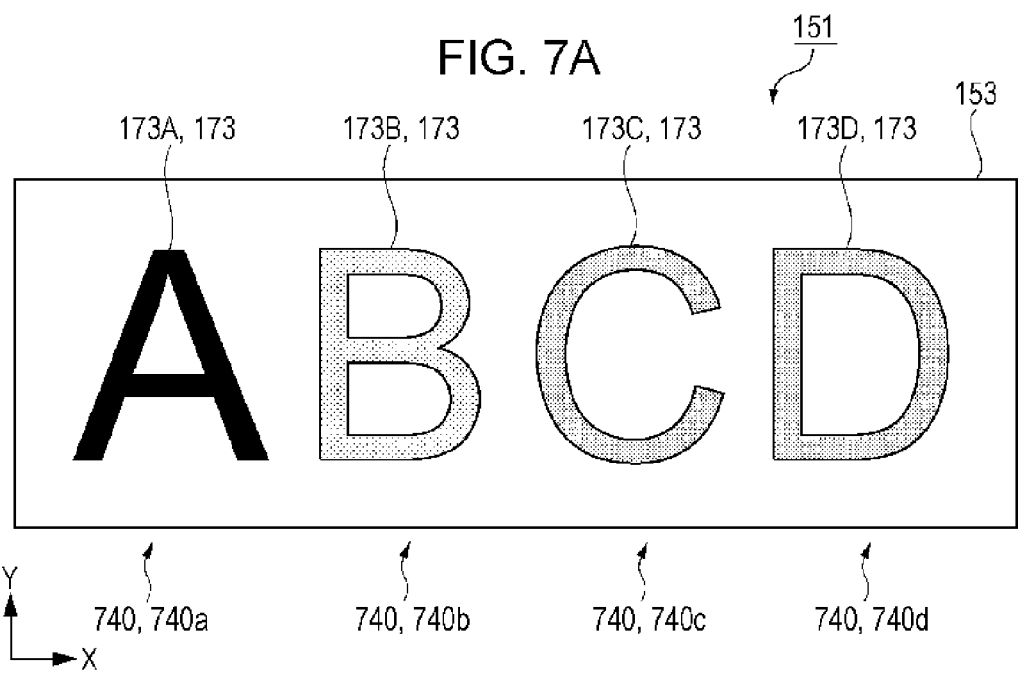
FIG. 7A is a schematic plan view illustrating a virtual image formed on the virtual image emerging ornamental body.
Figure 7B:
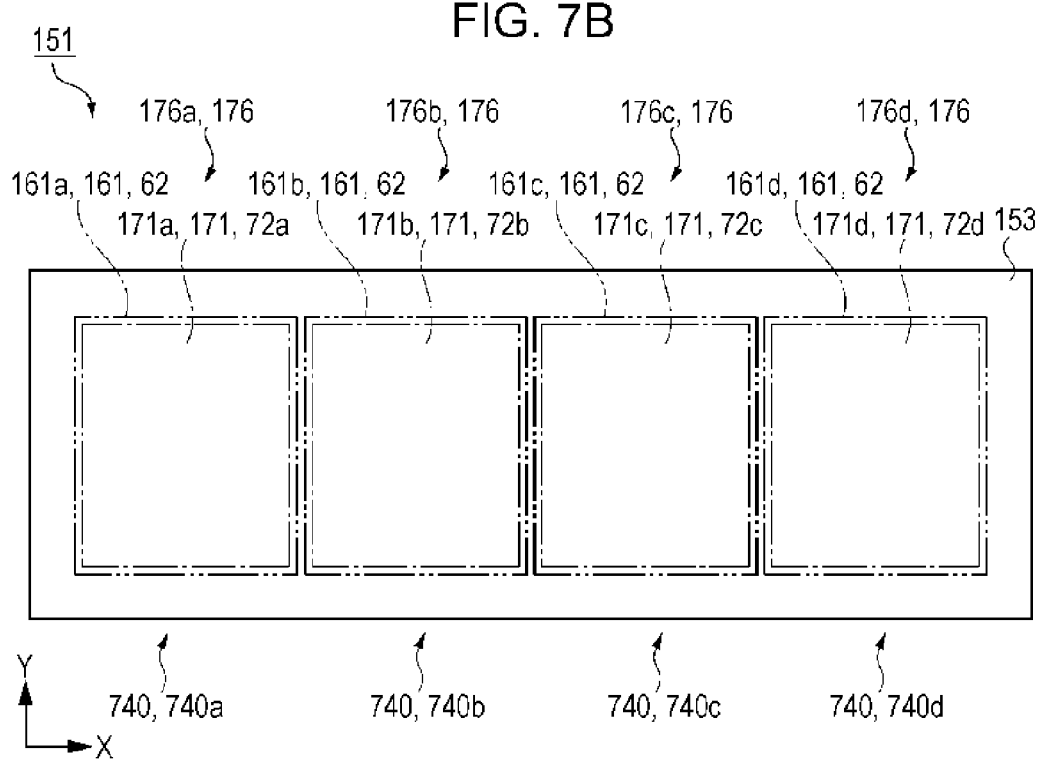
FIG. 7B is a plan view illustrating a configuration of the lens array and the pixel array of the virtual image emerging ornamental body.

Next, another virtual image emerging ornamental body 151, a configuration of a part of which is different from that of the virtual image emerging ornamental body 51 will be described with reference to FIGS. 7A and 7B, FIGS. 8A to 8C, and FIGS. 9A to 9D. First, an overall configuration of the virtual image emerging ornamental body 151 will be described with reference to FIGS. 7A and 7B. FIGS. 7A and 7B are schematic views illustrating a configuration of the virtual image emerging ornamental body. FIG. 7A is a schematic plan view illustrating a virtual image formed on the virtual image emerging ornamental body and FIG. 7B is a plan view illustrating a configuration of the lens array and the pixel array of the virtual image emerging ornamental body.

Similar to the virtual image emerging ornamental body 51, the virtual image emerging ornamental body 151 includes a base member 153, a lens array 161 including the micro-lenses 62 and a pixel array 171 including the pixel units 72. The base member 153 is the same member as the base member 53 described above and is a film-shaped member formed by a transparent material. The liquid repellent layer 55 is formed on one surface of the base member 153. The micro-lenses 62 configuring the lens array 161 are formed on the liquid repellent layer 55. The pixel units 72 configuring the pixel array 171 are formed on a surface opposite to the surface on which the liquid repellent layer 55 of the base member 53 is formed.

As illustrated in FIG. 7A, pixel virtual images 173 are visible when viewed from the same direction as the arrow direction is illustrated in FIG. 3A with respect to the virtual image emerging ornamental body 151. The letter A, the letter B, the letter C and the letter D are exemplified as the pixel virtual images 173 in FIG. 7A. The pixel virtual images 173 having the shape of the letter A, the letter B, the letter C or the letter D are referred to as a pixel virtual image 173A, a pixel virtual image 173B, a pixel virtual image 173C or a pixel virtual image 173D. A region in which one pixel virtual image 173 is formed is referred to as a virtual image region 740. The virtual image region 740 in which the pixel virtual image 173A, the pixel virtual image 173B, the pixel virtual image 173C or the pixel virtual image 173D are formed is referred to as a virtual image region 740a, a virtual image region 740b, a virtual image region 740c or a virtual image region 740d.

The lens array 161 is configured such that the micro-lenses 62 are arranged in a reticular pattern with an equal pitch interval. A set of the micro-lenses 62 formed on one virtual image region 740 is referred to as the lens array 161. The lens array 161 is formed in a region illustrated in a two-dot chain line in FIG. 7B. The lens arrays 161 formed in a virtual image region 740a, a virtual image region 740b, a virtual image region 740c or a virtual image region 740d are referred to as a lens array 161a, a lens array 161b, a lens array 161c or a lens array 161d.

Similar to the lens array 61 described above, the lens array 161a is configured such that the micro-lenses 62 are disposed vertically and horizontally with the pitch P1. In the lens array 161a, for example, 2025 micro-lenses 62 are formed with 45 lines×45 columns. For example, the pitch P1 is 180 μm. In the lens array 161b, the lens array 161c and the lens array 161d, the arrangement intervals of the micro-lenses 62 are different from that of the lens array 161a. The lens array 161b, the lens array 161c and the lens array 161d are described below in detail.

One pixel array 171 is formed in a region surrounded by a one-dot chain line in FIG. 7B. The pixel arrays 171 formed in the virtual image region 740a, the virtual image region 740b, the virtual image region 740c or the virtual image region 740d are referred to as a pixel array 171a, a pixel array 171b, a pixel array 171c or a pixel array 171d. The pixel array 171a has the same configuration as the A pixel array 71a described above. Similar to the A pixel array 71a, the pixel array 171a is configured such that the pixel units 72a are disposed vertically and horizontally with the pitch P2.

Similar to the pitch P2 and the pitch P1 in the virtual image emerging ornamental body 51 described above, the pitch P2 and the pitch P1 are set in values to satisfy a relationship of the pitch P1×(the number of lines or the number of columns of the micro-lenses 62 in the lens array 161-1)=the pitch P2×(the number of lines or the number of columns of the pixel units 72 in the pixel array 171).

In the pixel array 171a, for example, 2025 pixel units 72a are formed with 45 lines×45 columns. For example, the pitch P2 is 176 μm.

In the pixel array 171b, the pixel array 171c and the pixel array 171d illustrated in one-dot chain line in FIG. 7B, the pixel unit 72b, the pixel unit 72c or the pixel unit 72d having substantially similar shape as the pixel virtual image 173B, the pixel virtual image 173C or the pixel virtual image 173D are disposed. In the pixel array 171b, the pixel array 171c and the pixel array 171d, the pixel unit 72b, the pixel unit 72c or the pixel unit 72d is disposed similar to the arrangement of the pixel unit 72a in the pixel array 171a.

In the pixel array 171b, the pixel array 171c and the pixel array 171d, 2025 pixel units 72b, the pixel units 72c or the pixel units 72d with, for example, 45 lines×45 columns are formed similar to the pixel array 171a.

A set of the lens array 161 and the pixel array 171 is referred to as a virtual image unit 176. A set of the lens array 161a and the pixel array 171a is referred to as a virtual image unit 176a, a set of the lens array 161b and the pixel array 171b is referred to as a virtual image unit 176b, a set of the lens array 161c and the pixel array 171c is referred to as a virtual image unit 176c, and a set of the lens array 161d and the pixel array 171d is referred to as a virtual image unit 176d.

The pixel array 171 corresponds to the unit array. The micro-lens 62 corresponds to the condensing element. The lens array 161 corresponds to the condensing element array.

Lens Array

Figure 8A:
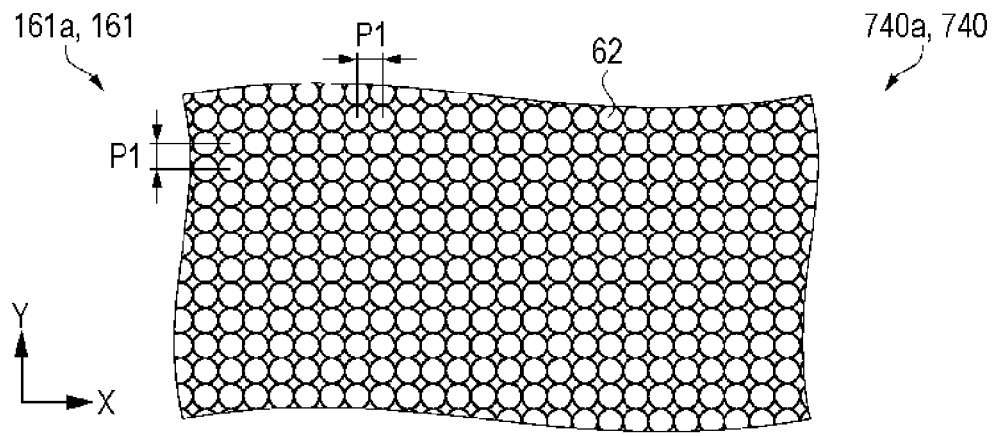
FIG. 8A is a plan view illustrating an arrangement of micro-lenses in a lens array.
Figure 8B:
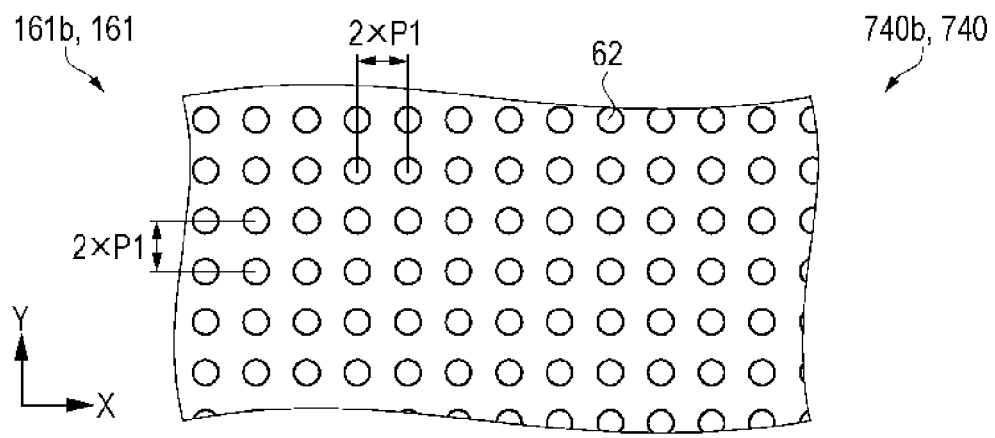
FIG. 8B is a plan view illustrating an arrangement of the micro-lenses in a lens array.
Figure 8C:
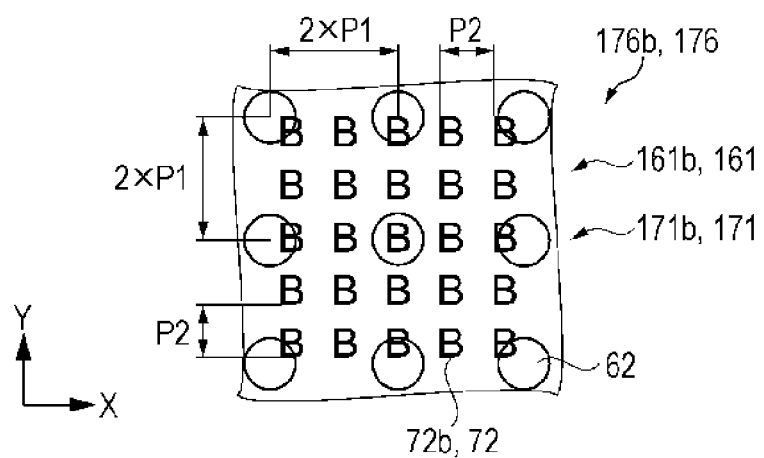
FIG. 8C is an enlarged plan view illustrating a configuration of the virtual image unit including the lens array.
Figure 9A:
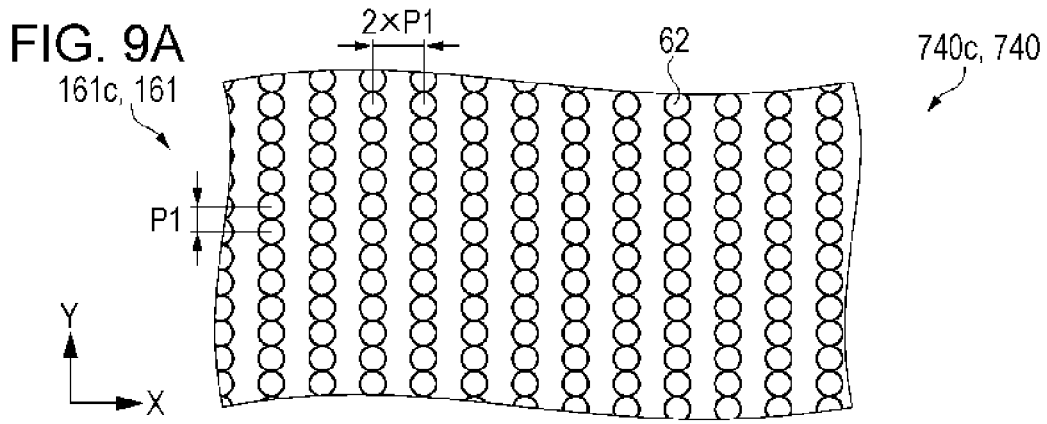
FIG. 9A is a plan view illustrating an arrangement of micro-lenses in a lens array.
Figure 9B:
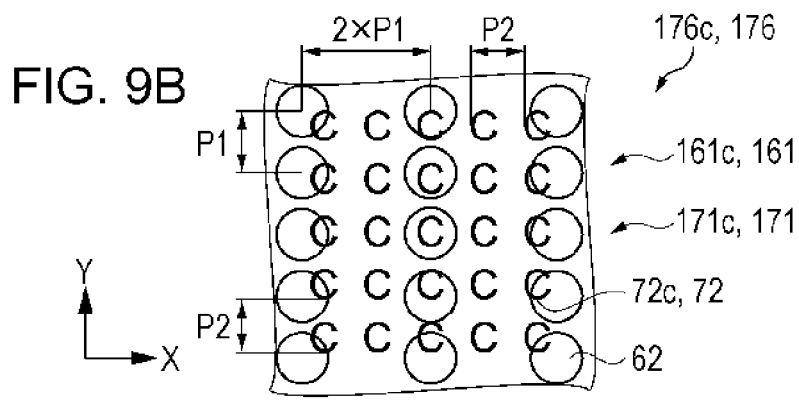
FIG. 9B is an enlarged plan view illustrating a configuration of the virtual image unit including the lens array.
Figure 9C:
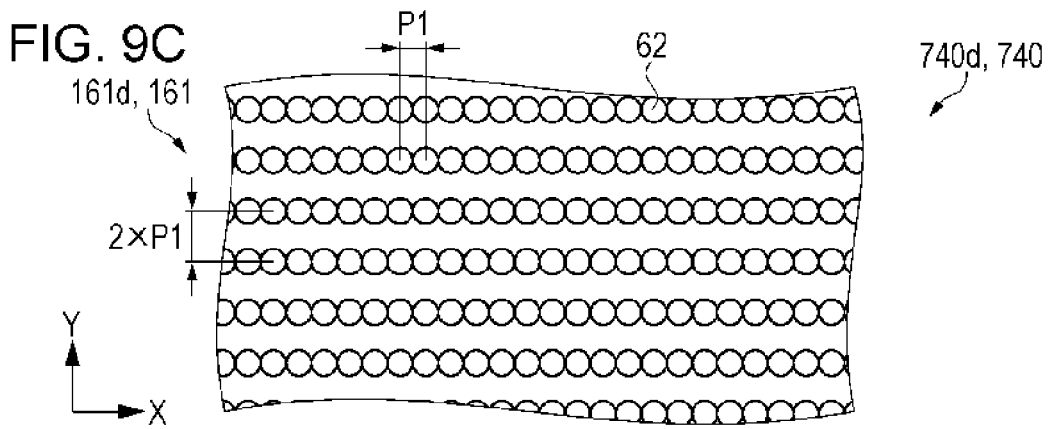
FIG. 9C is a plan view illustrating an arrangement of micro-lenses in a lens array.
Figure 9D:
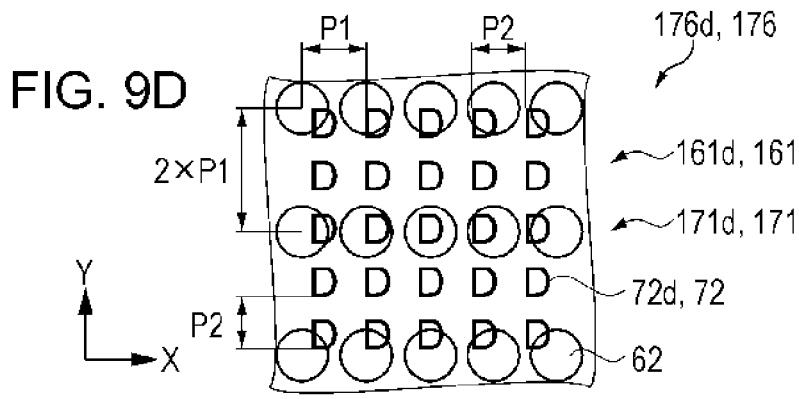
FIG. 9D is an enlarged plan view illustrating a configuration of the virtual image unit including the lens array.

Next, a configuration of the lens array 161 included in the virtual image emerging ornamental body 151 will be described with reference to FIGS. 8A to 8C and FIGS. 9A to 9D. FIGS. 8A to 8C and FIGS. 9A to 9D are explanatory views illustrating arrangement of micro-lenses in the lens array included in the virtual image emerging ornamental body and a positional relationship between micro-lens and the pixel unit. FIG. 8A is a plan view illustrating the arrangement of micro-lenses in the lens array 161a, FIG. 8B is a plan view illustrating the arrangement of the micro-lenses in a lens array 161b and FIG. 8C is an enlarged plan view illustrating a configuration of the virtual image unit including the lens array 161b. FIG. 9A is a plan view illustrating the arrangement of micro-lenses in a lens array 161c, FIG. 9B is an enlarged plan view illustrating a configuration of the virtual image unit including the lens array 161c, FIG. 9C is a plan view illustrating an arrangement of micro-lenses in a lens array 161d and FIG. 9D is an enlarged plan view illustrating a configuration of the virtual image unit including the lens array 161d.

First, the pixel virtual image 173A emerged in the virtual image region 740a including the lens array 161a will be described. As illustrated in FIG. 8A, similar to the lens array 61 described above, the lens arrays 161a disposed in the virtual image region 740a are configured such that the micro-lenses 62 are disposed vertically and horizontally with the pitch P1. In the lens array 161a, 2025 micro-lenses 62 are formed, for example, with 45 lines×45 columns. For example, the pitch P1 is 180 μm. In the pixel array 171a disposed in the virtual image region 740a, 2025 pixel units 72a are formed, for example, with 45 lines×45 columns. For example, the pitch P2 is 176 μm.

The positional relationship between the micro-lenses 62 and the pixel units 72a disposed in the virtual image region 740a is the same as the positional relationship between the micro-lenses 62 and the pixel units 72a disposed in the virtual image region 730a described with reference to FIG. 4F. According to the configuration, the pixel virtual image 173A similar to the pixel virtual image 73A emerged in the virtual image region 730a is emerged in the virtual image region 740a.

Next, the pixel virtual images 173B emerged in the virtual image region 740b including the lens array 161b will be described. As illustrated in FIG. 8B, the lens array 161b disposed in the virtual image region 740b is configured such that the micro-lenses 62 are disposed vertically and horizontally with the pitch (2×P1). When 2025 micro-lenses 62 are formed in the lens array 161a with 45 lines×45 columns, 529 micro-lenses 62 are formed in the lens array 161b, for example, with 23 lines×23 columns. For example, the pitch P1 is 180 μm and the pitch (2×P1) is 360 μm.

As described above, 2025 pixel units 72b are formed in the pixel array 171b disposed in the virtual image region 740b, for example, with 45 lines×45 columns. For example, the pitch P2 is 176 μm.

Similar to the virtual image unit 176a, in the virtual image unit 176b, the enlarged virtual image of a part of the pixel unit 72b are formed by the pixel unit 72b and the micro-lenses 62 corresponding to the pixel unit 72b. In the virtual image unit 176b, the pixel virtual image 173B in which the pixel unit 72b is enlarged by the lens array 161b is visibly formed. The pixel virtual image 173B is an array of the enlarged virtual images of a part of the pixel units 72b formed by the micro-lenses 62.

However, in the lens array 161b, the micro-lenses 62 are disposed vertically and horizontally with the pitch (2×P1). In other words, the number of the enlarged virtual images of a part of the pixel units 72b configuring the pixel virtual images 173B is approximately ¼ of the number of the enlarged virtual images of a part of the pixel units 72a configuring the pixel virtual images 173A. Thus, when the pixel unit 72a and the pixel unit 72b have the same color, the pixel virtual image 173B is viewed, for example, lighter than the pixel virtual image 173A.

In addition, in the pixel virtual image 173B and the pixel virtual image 73B described above, the number and the arrangement of the enlarged virtual images of a part of the pixel units 72b configuring the virtual images are substantially the same as each other.

In the pixel virtual image 73B, the micro-lenses 62 are present which emerge enlarged virtual images of a part of a background (a circumference of the pixel unit 72b) between the micro-lenses 62 which emerge the enlarged virtual images of a part of the pixel units 72b. The pixel virtual image 73B has a configuration in which points of the background color of the pixel unit 72b are arranged between points of the color of the pixel unit 72b configuring the enlarged virtual image.

In the pixel virtual image 173B, the surface of the liquid repellent layer 55 is present between the micro-lenses 62 which emerge the enlarged virtual images of a part of the pixel units 72b. In this part, the pixel unit 72b formed in a side opposite to the base member 153 is visible at full size via the liquid repellent layer 55 and the base member 153. The pixel unit 72b is very small and practically, it is impossible to visibly recognize the shape thereof. The portion between the micro-lenses 62 is visible so that the background thereof has the color which is affected by the color of the pixel unit 72b. The pixel virtual image 173B has a configuration in which the points of the color of the pixel unit 72b configuring the enlarged virtual image in the background color which is affected by the color of the pixel unit 72b.

The pixel virtual image 173B and the pixel virtual image 73B have a difference which is expressed as, for example, "a so-called texture difference".

Next, the pixel virtual image 173C emerged in the virtual image region 740c including the lens array 161c will be described. As illustrated in FIG. 9A, the lens arrays 161c disposed in the virtual image region 740c are configured such that the micro-lenses 62 are disposed with the pitch (2×P1) in the X-axis direction and the pitch P1 in the Y-axis direction. When 2025 micro-lenses 62 are formed in the lens array 161a, for example, with 45 lines×45 columns, 1035 micro-lenses 62 are formed in the lens array 161c, for example, with 45 lines×23 columns. For example, the pitch P1 is 180 μm and the pitch (2×P1) is 360 μm.

As described above, in the pixel array 171c disposed in the virtual image region 740c, 2025 pixel units 72c are formed, for example, with 45 lines×45 columns. For example, the pitch P2 is 176 μm.

Similar to the virtual image unit 176a, in the virtual image unit 176c, the enlarged virtual image of a part of the pixel units 72c are formed by the pixel unit 72c and the micro-lens 62 corresponding to the pixel unit 72c. In the virtual image unit 176c, the pixel virtual image 173C in which the pixel unit 72c is enlarged by the lens array 161 is visibly emerged. The pixel virtual image 173C is an array of the enlarged virtual images of a part of the pixel units 72c formed by the micro-lenses 62.

However, in the lens array 161c, the micro-lenses 62 are disposed with the pitch (2×P1) in the X-axis direction and the pitch P1 in the Y-axis direction. In other words, the number of the enlarged virtual images of a part of the pixel units 72c configuring the pixel virtual image 173C is approximately ½ of the number of the enlarged virtual images of a part of the pixel units 72a configuring the pixel virtual images 173A and is approximately 2 times the number of the enlarged virtual images of a part of the pixel units 72b configuring the pixel virtual images 173B. Thus, when the pixel unit 72c, the pixel unit 72a and the pixel unit 72b have the same color, color density of the pixel virtual image 173C is in the middle of that of the pixel virtual image 173A and the pixel virtual image 173B.

Next, the pixel virtual images 173D emerged in the virtual image region 740d including the lens array 161d will be described. As illustrated in FIG. 9c, the lens array 161d disposed in the virtual image region 740d is configured such that the micro-lenses 62 are disposed with the pitch P1 in the X-axis direction and the pitch (2×P1) in the Y-axis direction. When 2025 micro-lenses 62 are formed in the lens array 161a with 45 lines×45 columns, 1035 micro-lenses 62 are formed in the lens array 161d, for example, with 23 lines×45 columns. For example, the pitch P1 is 180 μm and the pitch (2×P1) is 360 μm.

As described above, 2025 pixel units 72d are formed in the pixel array 171d disposed in the virtual image region 740d, for example, with 45 lines×45 columns. For example, the pitch P2 is 176 μm.

Similar to the virtual image unit 176a, in the virtual image unit 176d, the enlarged virtual image of a part of the pixel unit 72d are formed by the pixel unit 72d and the micro-lens 62 corresponding to the pixel unit 72d. In the virtual image unit 176d, the pixel virtual image 173D in which the pixel unit 72d is enlarged by the lens array 161 is visibly emerged. The pixel virtual image 173D is an array of the enlarged virtual images of a part of the pixel units 72d formed by the micro-lenses 62.

However, in the lens array 161d, the micro-lenses 62 are disposed with the pitch 1 in the X-axis direction and the pitch (2×P1) in the Y-axis direction. In other words, the number of the enlarged virtual images of a part of the pixel units 72d configuring the pixel virtual images 173D is approximately ½ of the number of the enlarged virtual images of a part of the pixel units 72a configuring the pixel virtual images 173A and is approximately 2 times the number of the enlarged virtual images of a part of the pixel units 72b configuring the pixel virtual images 173B. Thus, when the pixel unit 72d, the pixel unit 72a and the pixel unit 72b have the same color, color density of the pixel virtual image 173D is in the middle of that of the pixel virtual image 173A and the pixel virtual image 173B.

Hereinafter, effects of the embodiments will be described. According to the embodiments, the following effects can be obtained.

(1) The pixel units 72b included in the B pixel array 71b are disposed vertically and horizontally with the pitch (2×P2). In other words, the number of the enlarged virtual images of a part of the pixel units 72b configuring the pixel virtual images 73B is approximately ¼ of the number of the enlarged virtual images of a part of the pixel units 72a configuring the pixel virtual images 73A. Accordingly, when the pixel unit 72a and the pixel unit 72b have the same color, the pixel virtual image 73B can be viewed, for example, lighter than the pixel virtual image 73A.

(2) The pixel units 72c or the pixel units 72d included in the C pixel array 71c and the D pixel array 71d are disposed with the pitch (2×P2) in one direction and the pitch P2 in the other direction. Therefore, the number of the enlarged virtual images of a part of the pixel units 72c or the pixel units 72d configuring the pixel virtual image 73C and the pixel virtual image 73D is approximately ½ of the number of the enlarged virtual images of a part of the pixel units 72a configuring the pixel virtual images 73A and is approximately 2 times the number of the enlarged virtual images of a part of the pixel units 72b configuring the pixel virtual images 73B. Thus, when the pixel unit 72c and the pixel unit 72d, the pixel unit

72a and the pixel unit 72b have the same color, color intensity of the pixel virtual image 73C and the pixel virtual image 73D can be in the middle of that of the pixel virtual image 73A and the pixel virtual image 73B.

(3) In the lens array 161b, the micro-lenses 62 are disposed vertically and horizontally with the pitch (2×P1). In other words, the number of the enlarged virtual images of a part of the pixel units 72b configuring the pixel virtual images 173B is approximately ¼ of the number of the enlarged virtual images of a part of the pixel units 72a configuring the pixel virtual images 173A. Accordingly, when the pixel unit 72a and the pixel unit 72b have the same color, the pixel virtual image 173B can be viewed, for example, lighter than the pixel virtual image 173A.

(4) In the lens array 161c and the lens array 161d, the micro-lenses 62 are disposed with the pitch (2×P1) in one direction and the pitch P1 in the other direction. Therefore, the number of the enlarged virtual images of a part of the pixel units 72c or the pixel units 72d configuring the pixel virtual image 173C and the pixel virtual image 173D is approximately ½ of the number of the enlarged virtual images of a part of the pixel units 72a configuring the pixel virtual images 173A and is approximately 2 times the number of the enlarged virtual images of a part of the pixel units 72b configuring the pixel virtual images 173B. Thus, when the pixel unit 72c and the pixel unit 72d, the pixel unit 72a and the pixel unit 72b have the same color, color density of the pixel virtual image 173C the pixel virtual image 173D can be in the middle of that of the pixel virtual image 173A and the pixel virtual image 173B.

(5) The pixel units 72 included in the B pixel array 71b are disposed with the pitch (2×P2). In the lens array 161b, the micro-lenses 62 are disposed with the pitch (2×P1). It is possible to easily reduce the number of the pixel units 72 or the micro-lenses 62 by thinning out the pixel units 72 or the micro-lenses 62 which are disposed in predetermined arrangement positions by doubling the arrangement pitch. As a result of thinning out by regular ratio, it is possible to eliminate the need to calculate new arrangement positions of the pixel units 72 and the micro-lenses 62.

(6) The pixel units 72 included in the B pixel array 71b are disposed with the pitch (2×P2). In the lens array 161b, the micro-lenses 62 are disposed with the pitch (2×P1). It is possible to dispose the pixel units 72 and the micro-lenses 62 evenly over the entire surface of the B pixel array 71b or the like or the lens arrays 161b or the like by doubling the arrangement pitch. Therefore, virtual images substantially similar to the pixel units 72 can be emerged even in the virtual image emerging ornamental body in which the density of the virtual image or the like is adjusted by reducing the number of the pixel units 72 and the micro-lenses 62.

(7) The liquid repellent layer 55 is formed on one surface of the base member 53 and the micro-lenses 62 are formed on the liquid repellent layer 55. Therefore, it is possible to easily form the lens shape which is grown by suppressing wet and spread out of the functional liquid discharged on the base member 53 when forming the micro-lenses 62 by disposing the functional liquid which includes the material of the micro-lenses 62.

Hereinbefore, the preferred embodiments are described with reference to the accompanying drawings; however, the preferred embodiments are not limited to the embodiments described above. Of course, the embodiments can be variously modified within a range which is not departed from the gist thereof and can be performed as the following modification examples.

Modification Example 1

In the embodiments described above, the virtual image emerging ornamental body 51 includes the pixel units 72 which are disposed with the arrangement pitch of multiple of a predetermined arrangement pitch and the virtual image emerging ornamental body 151 includes the lens arrays 161 in which the micro-lenses 62 are disposed with the arrangement pitch of multiple of a predetermined arrangement pitch. However, in one virtual image emerging ornamental body, it is not essential that only the pixel units or the condensing elements are disposed with the pitch which is an integral multiple of a predetermined arrangement pitch. In the line direction of a two-dimensional arrangement, one of the pixel units or the condensing elements may be disposed with the pitch which is an integral multiple of the predetermined arrangement pitch and in the column direction, the others may be disposed with the pitch which is an integral multiple thereof.

Modification Example 2

In the embodiments described above, the virtual image emerging ornamental body 51 includes the pixel units 72 which are disposed with the arrangement pitch of a multiple of a predetermined arrangement pitch and the virtual image emerging ornamental body 151 includes the lens arrays 161 in which the micro-lenses 62 are disposed with the arrangement pitch of multiple of a predetermined arrangement pitch. However, it is not essential that the arrangement pitch is a multiple of the predetermined arrangement pitch. Both or either of pixel units and the condensing elements may be disposed with the arrangement pitch of three times or more of the predetermined arrangement pitch. Of course, it is not preferable that the factors be excessive. It is preferable that the factors be factors in which the pixel units or the condensing elements are remained so that the shape of the virtual image which is formed can be visible. For example, it is preferable that the factors of the number of arrangements in one direction of the pixel units or the condensing elements are ten or less so as to be 1/10 of a case where the factor is one.

Modification Example 3

In the embodiments described above, the arrangement pitches of the pixel units 72 and the micro-lenses 62 are even in the same arrangement direction in one pixel array 71, one pixel array 171, one lens array 61 and one lens array 161. However, it is not essential that the arrangement pitch of the pixel units or the condensing elements is even in the same arrangement direction in one unit array and condensing element. The pixel units and the condensing elements may be arranged with a plurality of arrangement pitches in the same arrangement direction. For example, the arrangement pitch may be gradually increased or decreased. A so-called gradation can be given by gradually increasing or decreasing the arrangement pitch.

Modification Example 4

In the embodiments described above, the virtual image emerging ornamental body 51 and the virtual image emerging ornamental body 151 include a plurality of virtual image regions 730 (the virtual image units 76) or the virtual image regions 740 (the virtual image units 176). In addition, each of the virtual image regions 730 or the virtual image regions 740 includes the pixel array 71 or the lens array 161 which are different from each other. However, it is not essential that the plurality of unit arrays and the condensing element arrays included in the virtual image emerging ornamental body have the configurations which are different from each other. The virtual image emerging ornamental body may be configured to include a plurality of unit arrays or the condensing element arrays having the same configuration.

Modification Example 5

In the embodiments described above, the virtual image emerging ornamental body 51 and the virtual image emerging ornamental body 151 include a plurality of virtual image regions 730 (the virtual image units 76) or the virtual image regions 740 (the virtual image units 176). In addition, the pixel array 71 of the virtual image regions 730 or the pixel array 171 of the virtual image regions 740, respectively includes the pixel units 72 which are different from each other. However, it is not essential that the pixel units included in the plurality of unit arrays included in the virtual image emerging ornamental body be pixel units which are different from each other. The plurality of unit arrays included in the virtual image emerging ornamental body may have a configuration including common pixel units. The unit arrays configuring the plurality of virtual image units included in the virtual image emerging ornamental body may be integral unit arrays.

Modification Example 6

In the embodiments described above, the relationship between the arrangement pitch P1 of the micro-lenses 62 in the lens arrays 61 or the lens arrays 161 of the virtual image emerging ornamental body 51 and the virtual image emerging ornamental body 151 and the arrangement pitch P2 of the pixel units 72 in the pixel arrays 71 or the pixel arrays 171 is the pitch P1>the pitch P2. In addition, the relationship of the pitch P1×(the number of lines or the number of columns of the micro-lenses 62 in the lens array 61-1)=the pitch P2×(the number of lines or the number of columns of the pixel units 72 in the pixel array 71) is satisfied. Otherwise, the relationship of the pitch P1×(the number of lines or the number of columns of the micro-lenses 62 in the lens array 161-1)=the pitch P2×(the number of lines or the number of columns of the pixel units 72 in the pixel array 171) is satisfied. However, the relationship between the arrangement pitch P1 of the micro-lenses in the lens arrays and the arrangement pitch P2 of the pixel units in the pixel arrays may be the pitch P1<the pitch P2. When the pitch P1<the pitch P2, the pitch P1, the pitch P2, the number of lines and the number of columns of the micro-lenses in the lens array, and the number of lines and the number of columns of the pixel units in the pixel array are set so as to satisfy the relationship of the pitch P1×(the number of lines or the number of columns of the micro-lenses in the lens array+1)=the pitch P2×(the number of lines or the number of columns of the pixel units in the pixel array).

When the pitch P1>the pitch P2, the virtual image which is formed appears in depressed (on the depth side) from the position of the pixel array. When the pitch P1<the pitch P2, the virtual image which is formed appears in floated (on the front side) from the position of the pixel array.

Modification Example 7

In the embodiments described above, four virtual image units 76 or four virtual image units 176 are included in the virtual image emerging ornamental body 51 and the virtual image emerging ornamental body 151. However, any number of virtual image units may be included in the virtual image emerging ornamental body. The number of the virtual images emerged in the virtual image emerging ornamental body may be any number.

Modification Example 8

In the embodiments described above, the shape of the pixel unit 72 is a letter. However, the shape of the pixel unit is not limited to the letter. The shape of the pixel unit may be other shapes. In addition, it is not essential that the pixel unit is an independent image. The pixel unit may be configured of a plurality of images.

Modification Example 9

In the embodiments described above, the pixel array 71 or the like is formed by drawing the pixel units 72 configuring the pixel array 71 or the like included in the virtual image emerging ornamental body 51 or the like by using the ink jet type liquid droplet ejecting apparatus 1. However, it is not essential that the material for forming the pixel units is disposed by using the liquid droplet ejecting apparatus. The pixel units may be formed by using another printing method or the like.

Modification Example 10

In the embodiments described above, the lens array 61 is formed by forming the micro-lenses 62 configuring the lens array 61 included in the virtual image emerging ornamental body 51 or the like by using the ink jet type liquid droplet ejecting apparatus 1. However, it is not essential that the material of the micro-lenses 62 (the condensing elements) are disposed by using the liquid droplet ejecting apparatus. The micro-lenses 62 (the condensing elements) may be formed by using another printing method or the like.

Modification Example 11

In the embodiments described above, the pixel units and the condensing elements have the two-dimensional arrangement in which the pixel units and the condensing elements are arranged in two directions orthogonal to each other on the plane; however, the arrangement is not limited to the embodiment and arrangement in which the arrangement direction is not orthogonal to each other, is along a curved surface, or is only one direction or a complex thereof may be included.

The entire disclosure of Japanese Patent Application No. 2012-183896, filed Aug. 23, 2012 is expressly incorporated by reference herein.

What is claimed is:
1. A virtual image emerging ornamental body comprising:
a transparent base member;
a pixel array including pixel units formed on a first side of the base member, wherein the pixel units are associated with at least one arrangement pitch including a first arrangement pitch;
a condensing element array including condensing elements disposed on a second side of the base member, the condensing elements associated with the pixel units, wherein the condensing elements are associated with at least one arrangement pitch including a second arrangement pitch;
wherein a value of the first arrangement pitch or of the second arrangement pitch is two or more integral multiples of a value which is obtained by adding a predeter- mined difference between the first arrangement pitch and the second arrangement pitch to the other of the first arrangement pitch or the second arrangement pitch.

2. The virtual image emerging ornamental body according to claim 1,
wherein the pixel units and the condensing elements are disposed in a two-dimensional arrangement so that the factors of the integral multiples are different for every arrangement direction of the two-dimensional arrangement.

3. The virtual image emerging ornamental body according to claim 1,
wherein an arrangement pitch of the pixel units includes an arrangement pitch having a value of two or more integral multiples of a value which is obtained by adding a predetermined difference to a value of the arrangement pitch of the condensing elements.

4. The virtual image emerging ornamental body according to claim 1,
wherein an arrangement pitch of the condensing elements includes an arrangement pitch having a value of two or more integral multiples of a value which is obtained by adding a predetermined difference to a value of the arrangement pitch of the pixel units.

5. The virtual image emerging ornamental body according to claim 2,
wherein an arrangement pitch of the pixel units includes an arrangement pitch having a value of two or more integral multiples of a value which is obtained by adding a predetermined difference to a value of the arrangement pitch of the condensing elements in one arrangement direction of the two-dimensional arrangement, and
wherein an arrangement pitch of the condensing elements includes an arrangement pitch having a value of two or more integral multiples of a value which is obtained by adding a predetermined difference to a value of the arrangement pitch of the pixel units in the other arrangement direction of the two-dimensional arrangement.

6. The virtual image emerging ornamental body according to claim 1, further comprising:
a plurality of virtual image units of which each is a set of the unit array and the condensing element array,
wherein the factors of the integral multiples are different for every virtual image unit.

7. The virtual image emerging ornamental body according to claim 1,
wherein the values of the integral multiples are different depending on locations.

8. A method for manufacturing a virtual image emerging ornamental body including a transparent base member, a pixel array including pixel units formed on a first side of the base member, wherein the pixel units are associated with at least one arrangement pitch including a first arrangement pitch, a condensing element array including condensing elements disposed on a second side of the base member, the condensing elements associated with the pixel units, wherein the condensing elements are associated with at least one arrangement pitch including a second arrangement pitch, comprising:
disposing at least a part of one of the pixel units and the condensing elements on the transparent base member, a value of the first arrangement pitch or of the second arrangement pitch is two or more integral multiples of a value which is obtained by adding a predetermined difference between the first arrangement pitch and the second arrangement pitch to the other of the first arrangement pitch or the second arrangement pitch; and
forming both or one of the pixel units and the condensing elements by using a liquid droplet ejecting apparatus which ejects liquid droplets.

9. The virtual image emerging ornamental body according to claim 1, further comprising a liquid repellant layer formed between the base member and the condensing element array.

* * * * *